(12) United States Patent
Zhao et al.

(10) Patent No.: US 12,170,764 B2
(45) Date of Patent: Dec. 17, 2024

(54) MAPPING INTRA PREDICTION ANGLES OUTSIDE A RANGE TO INTRA PREDICTION MODES ACCORDING TO A PREDETERMINED RELATIONSHIP

(71) Applicant: Tencent America LLC, Palo Alto, CA (US)

(72) Inventors: Xin Zhao, San Diego, CA (US); Liang Zhao, Sunnyvale, CA (US); Shan Liu, San Jose, CA (US); Xiang Li, Los Gatos, CA (US)

(73) Assignee: Tencent America LLC, Palo Alto, CA (US)

( * ) Notice: Subject to any disclaimer, the term of this patent is extended or adjusted under 35 U.S.C. 154(b) by 3 days.

(21) Appl. No.: 17/978,125

(22) Filed: Oct. 31, 2022

(65) Prior Publication Data

US 2023/0060151 A1 Mar. 2, 2023

Related U.S. Application Data

(63) Continuation of application No. 17/940,936, filed on Sep. 8, 2022, now Pat. No. 11,930,167, which is a
(Continued)

(51) Int. Cl.
*H04N 19/11* (2014.01)
*H04N 19/176* (2014.01)
*H04N 19/70* (2014.01)

(52) U.S. Cl.
CPC .......... *H04N 19/11* (2014.11); *H04N 19/176* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 8,526,495 B2 | 9/2013 | Liu et al. | |
| 9,049,452 B2 | 6/2015 | Liu et al. | |

(Continued)

FOREIGN PATENT DOCUMENTS

| | | | |
|---|---|---|---|
| CN | 104247425 A | 12/2014 | |
| CN | 105264889 A | 1/2016 | |

(Continued)

OTHER PUBLICATIONS

KR2017-10-0178884 (machine translated document). Dec. 17, 2017. (Year: 2017).*

(Continued)

*Primary Examiner* — Talha M Nawaz
(74) *Attorney, Agent, or Firm* — ArentFox Schiff LLP

(57) ABSTRACT

A method for video encoding includes determining an intra prediction angle for encoding a current block in a coded video sequence, the intra prediction angle being (i) beyond a bottom left direction diagonal mode, or (ii) beyond a top right direction diagonal mode. The method further includes determining an intra prediction mode corresponding to the intra prediction angle used to encode the current block based on a predetermined relationship between a plurality of intra prediction modes and a corresponding plurality of intra prediction angles, and generating prediction information indicating the determined intra prediction mode corresponding to the intra prediction angle used to encode the current block.

20 Claims, 13 Drawing Sheets

Related U.S. Application Data continuation of application No. 16/985,866, filed on Aug. 5, 2020, now Pat. No. 11,533,478, which is a continuation of application No. 16/359,631, filed on Mar. 20, 2019, now Pat. No. 10,771,782, which is a continuation of application No. 16/147,313, filed on Sep. 28, 2018, now Pat. No. 10,284,844.

(60) Provisional application No. 62/711,390, filed on Jul. 27, 2018, provisional application No. 62/693,050, filed on Jul. 2, 2018.

(56) References Cited

U.S. PATENT DOCUMENTS

| | | | |
|---|---|---|---|
| 9,363,511 | B2 | 6/2016 | Zhang et al. |
| 9,374,590 | B2* | 6/2016 | Sun ............... H04N 19/182 |
| 9,510,012 | B2 | 11/2016 | Liu et al. |
| 9,769,472 | B2 | 9/2017 | Liu et al. |
| 9,813,726 | B2 | 11/2017 | Liu et al. |
| 11,711,534 | B2* | 7/2023 | Lee ............... H04N 19/132 |
| | | | 375/240.26 |
| 2003/0161501 | A1 | 8/2003 | Park et al. |
| 2011/0249735 | A1 | 10/2011 | Zhao et al. |
| 2013/0114696 | A1 | 5/2013 | Liu |
| 2013/0114700 | A1 | 5/2013 | Moriya et al. |
| 2013/0114712 | A1 | 5/2013 | Yamamoto et al. |
| 2013/0128961 | A1 | 5/2013 | Kim et al. |
| 2014/0092978 | A1* | 4/2014 | Bugdayci ............ H04N 19/30 |
| | | | 375/240.16 |
| 2014/0286400 | A1 | 9/2014 | Joshi et al. |
| 2016/0050422 | A1 | 2/2016 | Rosewarne et al. |
| 2016/0112646 | A1 | 4/2016 | Tsunoda |
| 2017/0094274 | A1* | 3/2017 | Chien ............... H04N 19/159 |
| 2017/0150183 | A1 | 5/2017 | Zhang et al. |
| 2017/0272745 | A1 | 9/2017 | Liu et al. |
| 2017/0353730 | A1 | 12/2017 | Liu et al. |
| 2018/0098064 | A1 | 4/2018 | Seregin et al. |
| 2018/0184082 | A1* | 6/2018 | Yoo ............... H04N 19/159 |
| 2019/0014325 | A1* | 1/2019 | Lin ............... H04N 19/159 |
| 2019/0052875 | A1* | 2/2019 | Son ............... H04N 19/85 |
| 2019/0149821 | A1* | 5/2019 | Moon ............... H04N 19/105 |
| | | | 375/240.02 |
| 2019/0174128 | A1 | 6/2019 | Jang et al. |
| 2019/0182481 | A1* | 6/2019 | Lee ............... H04N 19/70 |
| 2019/0313093 | A1 | 10/2019 | Filippov et al. |
| 2019/0313118 | A1 | 10/2019 | Filippov et al. |
| 2020/0021805 | A1* | 1/2020 | Ko ............... H04N 19/70 |
| 2020/0021817 | A1* | 1/2020 | Van der Auwera .. H04N 19/159 |
| 2020/0322601 | A1* | 10/2020 | Ko ............... H04N 19/70 |
| 2020/0336746 | A1* | 10/2020 | Zhao ............... H04N 19/159 |
| 2020/0351506 | A1* | 11/2020 | Rath ............... H04N 19/105 |
| 2021/0006778 | A1* | 1/2021 | Kim ............... H04N 19/119 |
| 2021/0092362 | A1* | 3/2021 | Lee ............... H04N 19/159 |
| 2021/0112252 | A1 | 4/2021 | Heo et al. |
| 2021/0120237 | A1* | 4/2021 | Filippov ............... H04N 19/176 |
| 2021/0120240 | A1* | 4/2021 | Bross ............... H04N 19/70 |
| 2021/0211717 | A1* | 7/2021 | Lee ............... H04N 19/132 |
| 2021/0250577 | A1* | 8/2021 | Leleannec ............ H04N 19/593 |

FOREIGN PATENT DOCUMENTS

| | | |
|---|---|---|
| KR | 20140049098 A | 4/2014 |
| WO | 2008016605 A2 | 2/2008 |
| WO | 2013023518 A1 | 2/2013 |
| WO | 2018030599 A1 | 2/2018 |
| WO | 2018117891 A1 | 6/2018 |
| WO | 2018117892 A1 | 6/2018 |
| WO | 2018117894 A1 | 6/2018 |
| WO | 2018127624 A1 | 7/2018 |
| WO | 2019222042 A1 | 11/2019 |

OTHER PUBLICATIONS

Bross et al., "Versatile Video Coding (Draft 2)," Joint Video Experts Team (JVET) of ITU-T SG 16 WP 3 and ISO/IEC JTC 1/SC 29/WG 11, 11th Meeting: Ljublijana, SI, Jul. 10-18, 2018, Document: JVET-K1001-v6, 139 pages.

Extended European Search Report in EP19829937.2, mailed Mar. 14, 2022, 8 pages.

Extended European Search Report in EP19830478.4, mailed Apr. 11, 2022, 8 pages.

International Telecommunication Union, High Efficiency Video Coding, ITU-T: Telecommunication Standardization Sector of ITU, H.265, Dec. 2016, 664 pages.

Liu et al., "Rectangular (2N×N and N×2N) Intra Prediction," Joint Collaborative Team on Video Coding (JCT-VC) of ITU-T SG16 WP3 and ISO/IEC JTC1/SC29/WG11, 7th Meeting: Geneva, Nov. 21-30, 2011, Document: JCTVC-G135, 6 pages.

Liu et al., "Rectangular partitioning for Intra prediction in HEVC," 2012 Visual Communications and Image Processing, 2012, 6 pages.

Office Action in CN201980018529.7, mailed Mar. 24, 2022, 11 pages.

Office Action in CN201910583302.9, mailed Mar. 25, 2022, 10 pages.

Office Action in JP2020551480, mailed Oct. 19, 2021, 5 pages.

Office Action in JP2020551480, mailed Apr. 5, 2022, 4 pages.

Office Action in JP2020545523, mailed Jul. 27, 2021, 6 pages.

Office Action in JP2020560184, mailed Dec. 14, 2021, 5 pages.

Office Action in KR1020207029048, mailed Apr. 11, 2022, 5 pages.

Racape et al., "CE3-related: Wide-angle intra prediction for non-square blocks," Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0500_r1, 7 pages.

Sjoberg et al., "Description of SDR and HDR video coding technology proposal by Ericsson and Nokia," Joint Video Exploration Team (JVET) of ITU-T SG 16 WP 3 and ISO/IEC JTC 1/SC 29/WG 11, 10th Meeting: San Diego, CA, USA, Apr. 10-20, 2018, Document: JVET-J0012-v1, 32 pages.

Zhang et al., "Intra mode coding in HEVC standard," 2012 Visual Communications and Image Processing, 2012, 6 pages.

Zhang et al., "Non-CE6: Intra mode coding with fixed length binarization," Joint Collaborative Team on Video Coding (JCT-VC) of ITU-T SG16 WP3 and ISO/IEC JTC1/SC29/WG11, 8th Meeting: San Jose, USA, Feb. 1-10, 2012, Document: JCTVC-H0435, 5 pages.

Chinese Office Action issued Dec. 12, 2022 in Application No. 201980033765.6, with Concise English Translation, 16 pages.

* cited by examiner

MAPPING INTRA PREDICTION ANGLES OUTSIDE A RANGE TO INTRA PREDICTION MODES ACCORDING TO A PREDETERMINED RELATIONSHIP

INCORPORATION BY REFERENCE

This application is a continuation of U.S. application Ser. No. 17/940,936, filed on Sep. 8, 2022, which claims the benefit of priority to U.S. application Ser. No. 16/985,866, filed on Aug. 5, 2020, which claims benefit of U.S. application Ser. No. 16/359,631 (now U.S. Pat. No. 10,771,782), filed on Mar. 20, 2019, U.S. application Ser. No. 16/147,313 (now U.S. Pat. No. 10,284,844), filed on Sep. 28, 2018, which claims benefit of U.S. Provisional Application No. 62/711,390, "Improvements on Wide-Angle Intra Prediction" filed on Jul. 27, 2018, and U.S. Provisional Application No. 62/693,050, "Methods and Apparatus for Wide Angular Intra Prediction in Video Compression" filed on Jul. 2, 2018. The entire disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In Intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used in as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer bits are required at a given quantization step size to represent the block after entropy coding.

Traditional intra coding such as known from, for example MPEG-2 generation coding technologies does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), benchmark set (BMS). A predictor block can be formed using neighboring samples values belonging to already available samples. Sample values of neighboring samples are copied into the predictor block according to a direction. A reference to the direction in use can be coded in the bitstream or may itself be predicted.

Referring to FIG. 1, depicted in the lower right is a subset of nine predictor directions known from the 35 possible predictor directions in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower right of sample (101), in a 22.5 degree angle from the horizontal.

Still referring to FIG. 1, on the top left there is depicted a square block (104) of 4×4 samples (indicated by a dashed, boldface line). The square block (104) incudes 16 samples, each labelled with an "S", its position in Y dimension (e.g., row index) and its position in X dimension (e.g., column index). For example, a sample S21 is the second sample in Y dimensions (from the top) and the first (from the left) sample in X dimension. Similarly, a sample S44 is the fourth sample in the block (104) in both Y and X dimension. As the block (104) is 4×4 samples in size, the sample S44 is at the bottom right. Further shown are reference samples, that follow a similar numbering scheme. A reference sample is labelled with an R, its Y position (e.g., row index) and X position (column index) relative to the block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from prediction sample or samples to the upper right, at a 45 degree angle from the horizontal. In that case, samples S41, S32, S23, and S14 are predicted from same R05. Sample S44 is then predicted from R08.

In certain cases, the values of multiple reference samples may be combined, for example through interpolation, in order to calculate a reference sample; especially when the directions are not evenly divisible by 45 degrees.

The number of possible directions has increased as video coding technology developed. In H.264 (2003), nine different directions could be represented. That increased to 33 in H.265 (2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can be sometimes be predicted from neighboring directions used in neighboring, already decoded, blocks.

FIG. 2 is a schematic 201 that depicts 67 intra prediction modes according to JEM to illustrate the increasing number of prediction directions over time.

The mapping of an intra prediction directions bits in the coded video bitstream that represent the direction can be different form video coding technology to video coding technology; and can range, for example, from simple direct mappings of prediction direction to intra prediction mode to codewords, to complex adaptive schemes involving most probably modes and similar techniques. A person skilled in the art is readily familiar with those techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

SUMMARY

Aspects of the disclosure provide method and apparatus for video coding. In some examples, an apparatus includes receiving circuitry and processing circuitry.

One embodiment of the invention is directed to a method for video decoding in a decoder. The method includes decoding at least one syntax element from a coded video sequence, the at least one syntax element indicative of an intra prediction mode, determining an intra prediction angle that corresponds to the indicated intra prediction mode based on a stored relationship between a plurality of intra prediction modes and a plurality of intra prediction angles, and reconstructing at least one sample of a block using the intra prediction angle that is determined to correspond to the indicated intra prediction mode. The plurality of intra prediction modes in the stored relationship can include at least one of a first plurality of wide angle prediction modes and a second plurality of wide angle prediction modes. The first plurality of angle prediction modes is beyond a bottom left direction diagonal mode, and the second plurality of angle prediction modes is beyond a top right direction diagonal mode. The relation may be stored as a look-up table.

Another embodiment of the invention is directed to a video decoder. The decoder includes processing circuitry configured to decode at least one syntax element from a coded video sequence, the at least one syntax element indicative of an intra prediction mode, determine an intra prediction angle that corresponds to the indicated intra prediction mode based on a stored relationship between a plurality of intra prediction modes and a plurality of intra prediction angles, and reconstruct at least one sample of a block using the intra prediction angle that is determined to correspond to the indicated intra prediction mode. The plurality of intra prediction modes in the stored relationship can include at least one of a first plurality of wide angle prediction modes and a second plurality of wide angle prediction modes. The first plurality of angle prediction modes is beyond a bottom left direction diagonal mode, and the second plurality of angle prediction modes is beyond a top right direction diagonal mode. The decoder may store the relation as a look-up table.

Aspects of the disclosure also provide a non-transitory computer-readable medium storing instructions which when executed by a computer for video decoding cause the computer to perform the method for video coding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
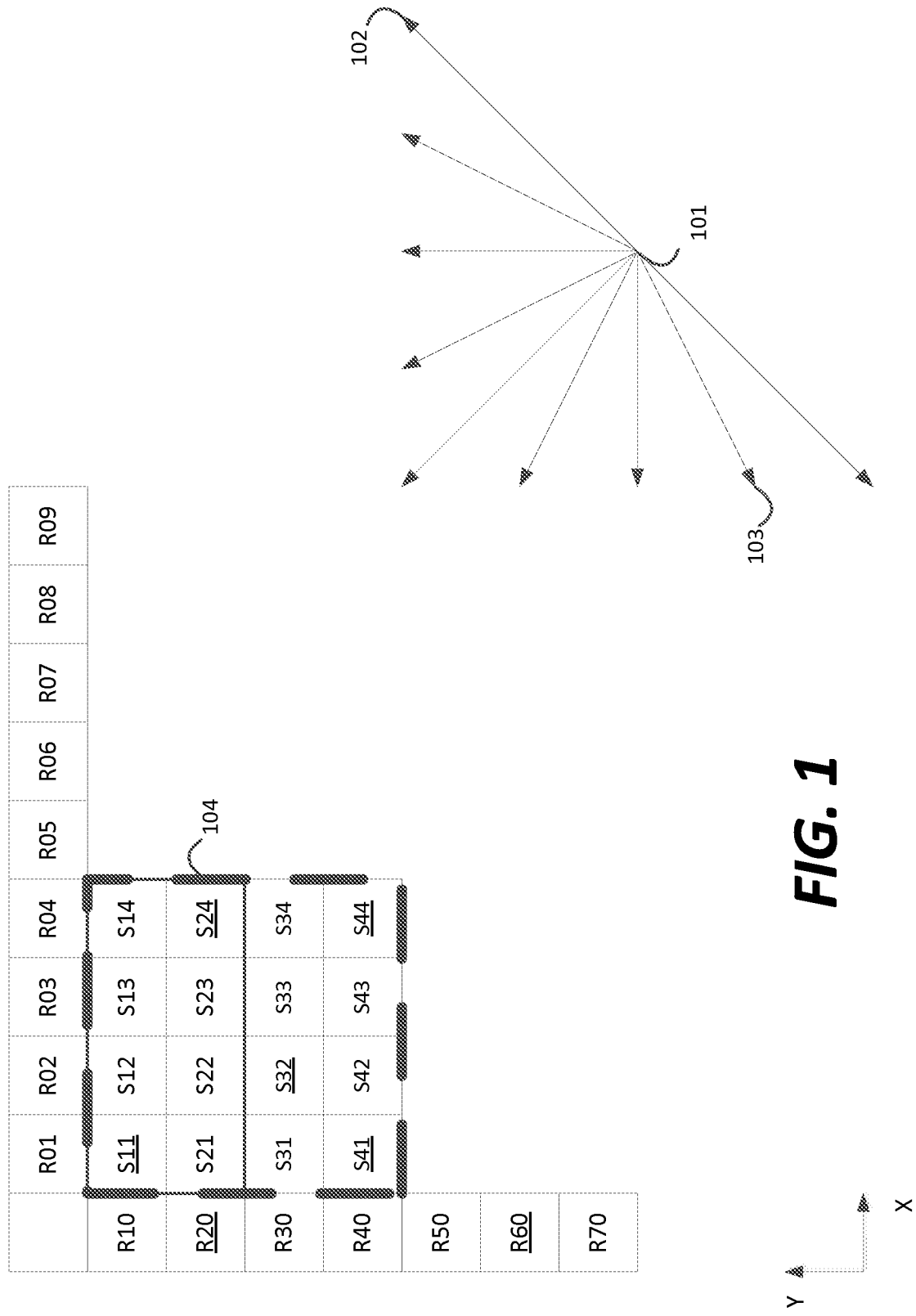
FIG. 1 is a schematic illustration of exemplary intra prediction modes.
Figure 2:
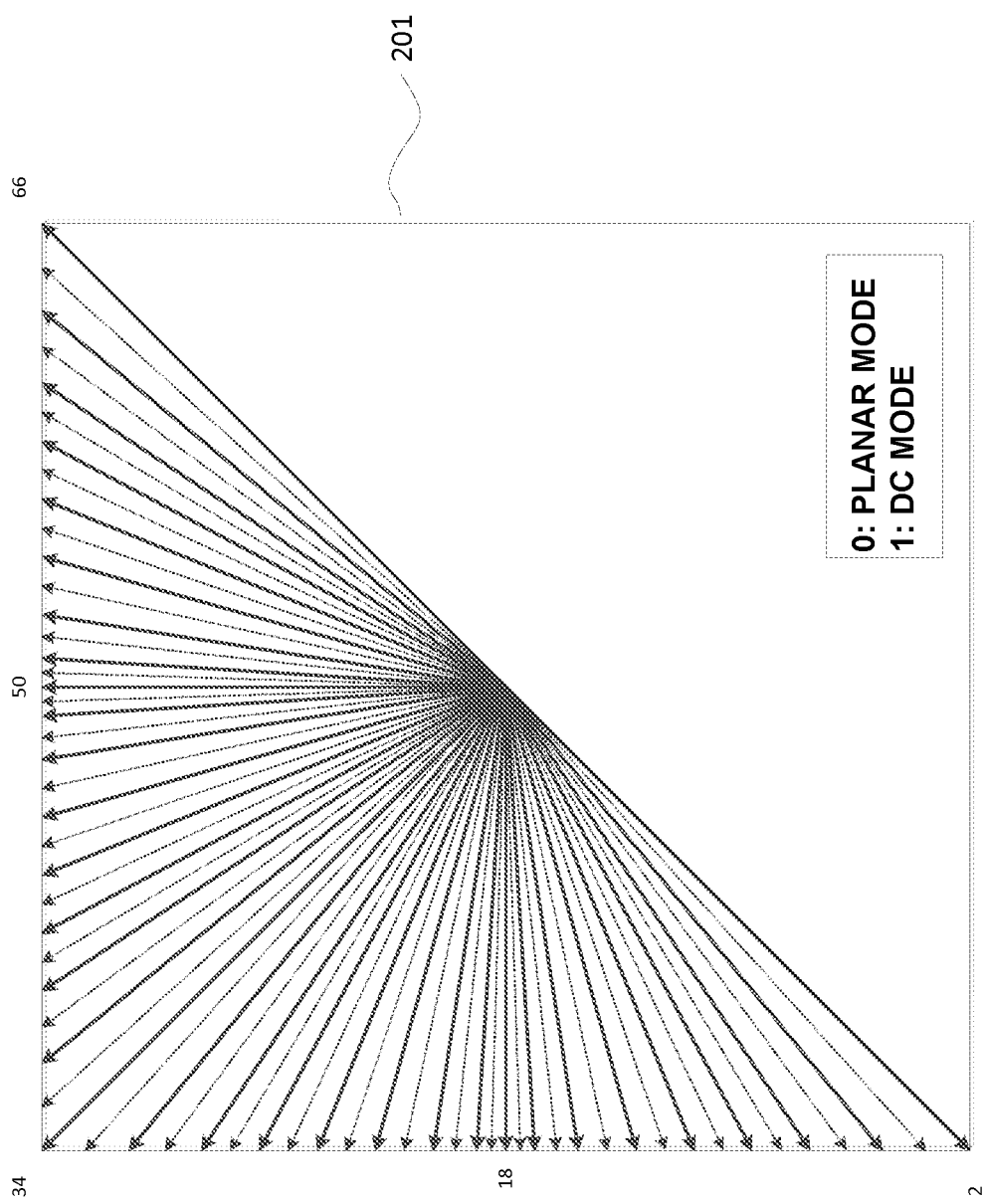
FIG. 2 is another illustration of exemplary intra prediction modes.
Figure 3:
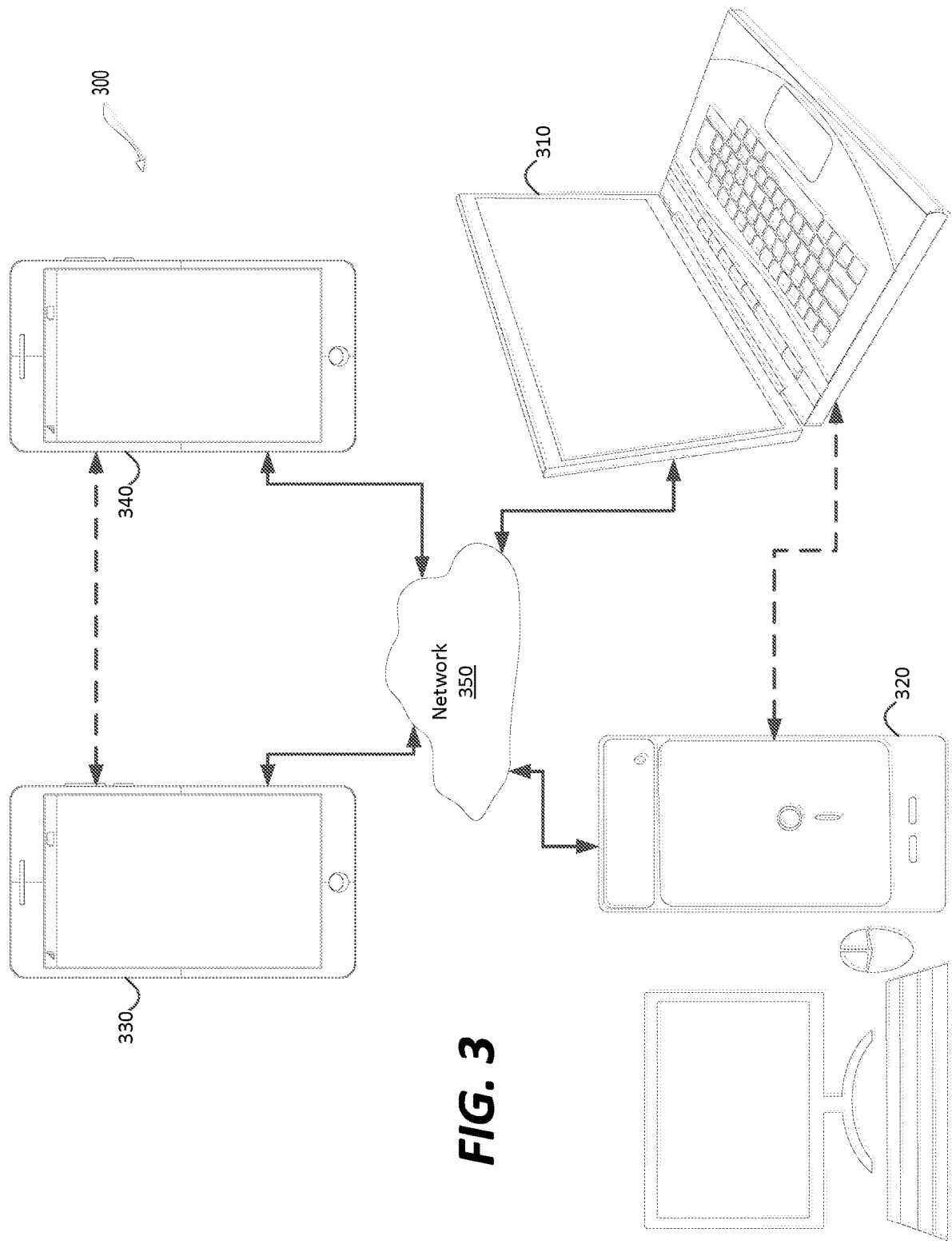
FIG. 3 is a schematic illustration of a simplified block diagram of a communication system in accordance with an embodiment.

FIG. 3 illustrates a simplified block diagram of a communication system 300 according to an embodiment of the present disclosure. The communication system 300 includes a plurality of terminal devices that can communicate with each other, via, for example, a network 350. For example, the communication system 300 includes a first pair of terminal devices 310 and 320 interconnected via the network 350. In the FIG. 3 example, the first pair of terminal devices 310 and 320 performs unidirectional transmission of data. For example, the terminal device 310 may code video data (e.g., a stream of video pictures that are captured by the terminal device 310) for transmission to the other terminal device 320 via the network 350. The encoded video data can be transmitted in the form of one or more coded video bitstreams. The terminal device 320 may receive the coded video data from the network 350, decode the coded video data to recover the video pictures and display video pictures according to the recovered video data. Unidirectional data transmission may be common in media serving applications and the like.

In another example, the communication system 300 includes a second pair of terminal devices 330 and 340 that performs bidirectional transmission of coded video data that may occur, for example, during videoconferencing. For bidirectional transmission of data, in an example, each terminal device of the terminal devices 330 and 340 may code video data (e.g., a stream of video pictures that are captured by the terminal device) for transmission to the other terminal device of the terminal devices 330 and 340 via the network 350. Each terminal device of the terminal devices 330 and 340 also may receive the coded video data transmitted by the other terminal device of the terminal devices 330 and 340, and may decode the coded video data to recover the video pictures and may display video pictures at an accessible display device according to the recovered video data.

In the FIG. 3 example, the terminal devices 310, 320, 330 and 340 may be illustrated as servers, personal computers and smart phones but the principles of the present disclosure may be not so limited. Embodiments of the present disclosure find application with laptop computers, tablet computers, media players and/or dedicated video conferencing equipment. The network 350 represents any number of networks that convey coded video data among the terminal devices 310, 320, 330 and 340, including for example wireline (wired) and/or wireless communication networks. The communication network 350 may exchange data in circuit-switched and/or packet-switched channels. Representative networks include telecommunications networks, local area networks, wide area networks and/or the Internet. For the purposes of the present discussion, the architecture and topology of the network 350 may be immaterial to the operation of the present disclosure unless explained herein below.

Figure 4:
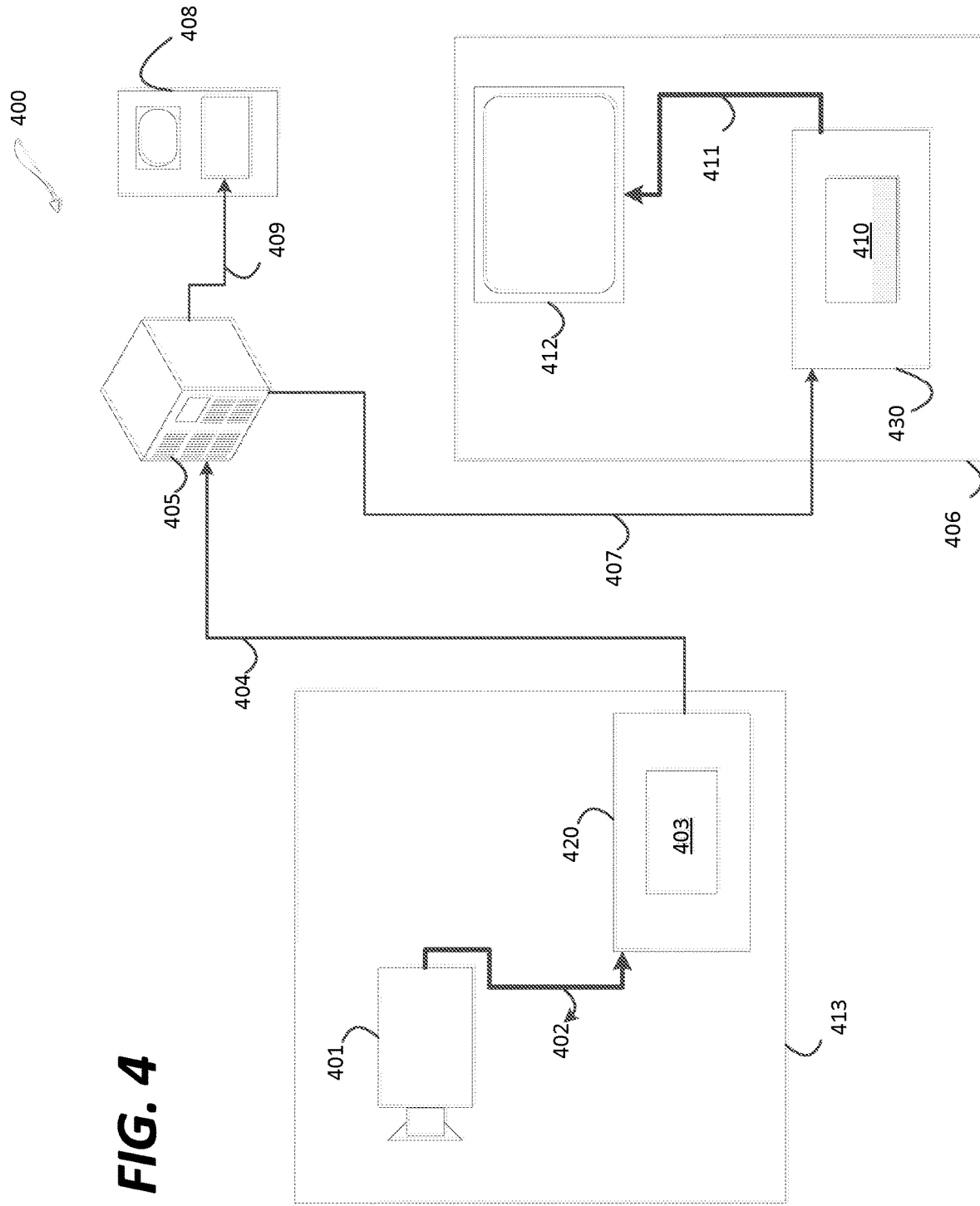
FIG. 4 is a schematic illustration of a simplified block diagram of a communication system in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 413, that can include a video source 401, for example a digital camera, creating for example a stream of video pictures 402 that are uncompressed. In an example, the stream of video pictures 402 includes samples that are taken by the digital camera. The stream of video pictures 402, depicted as a bold line to emphasize a high data volume when compared to encoded video data 404 (or coded video bitstreams), can be processed by an electronic device 420 that includes a video encoder 403 coupled to the video source 401. The video encoder 403 can include hardware, software, or a combination thereof to enable or implement aspects of the disclosed subject matter as described in more detail below. The encoded video data 404 (or encoded video bitstream 404), depicted as a thin line to emphasize the lower data volume when compared to the stream of video pictures 402, can be stored on a streaming server 405 for future use. One or more streaming client subsystems, such as client subsystems 406 and 408 in FIG. 4 can access the streaming server 405 to retrieve copies 407 and 409 of the encoded video data 404. A client subsystem 406 can include a video decoder 410, for example, in an electronic device 430. The video decoder 410 decodes the incoming copy 407 of the encoded video data and creates an outgoing stream of video pictures 411 that can be rendered on a display 412 (e.g., display screen) or other rendering device (not depicted). In some streaming systems, the encoded video data 404, 407, and 409 (e.g., video bitstreams) can be encoded according to certain video coding/compression standards. Examples of those standards include ITU-T Recommendation H.265. In an example, a video coding standard under development is informally known as Versatile Video Coding or VVC. The disclosed subject matter may be used in the context of VVC.

It is noted that the electronic devices 420 and 430 can include other components (not shown). For example, the electronic device 420 can include a video decoder (not shown) and the electronic device 430 can include a video encoder (not shown) as well.

Figure 5:
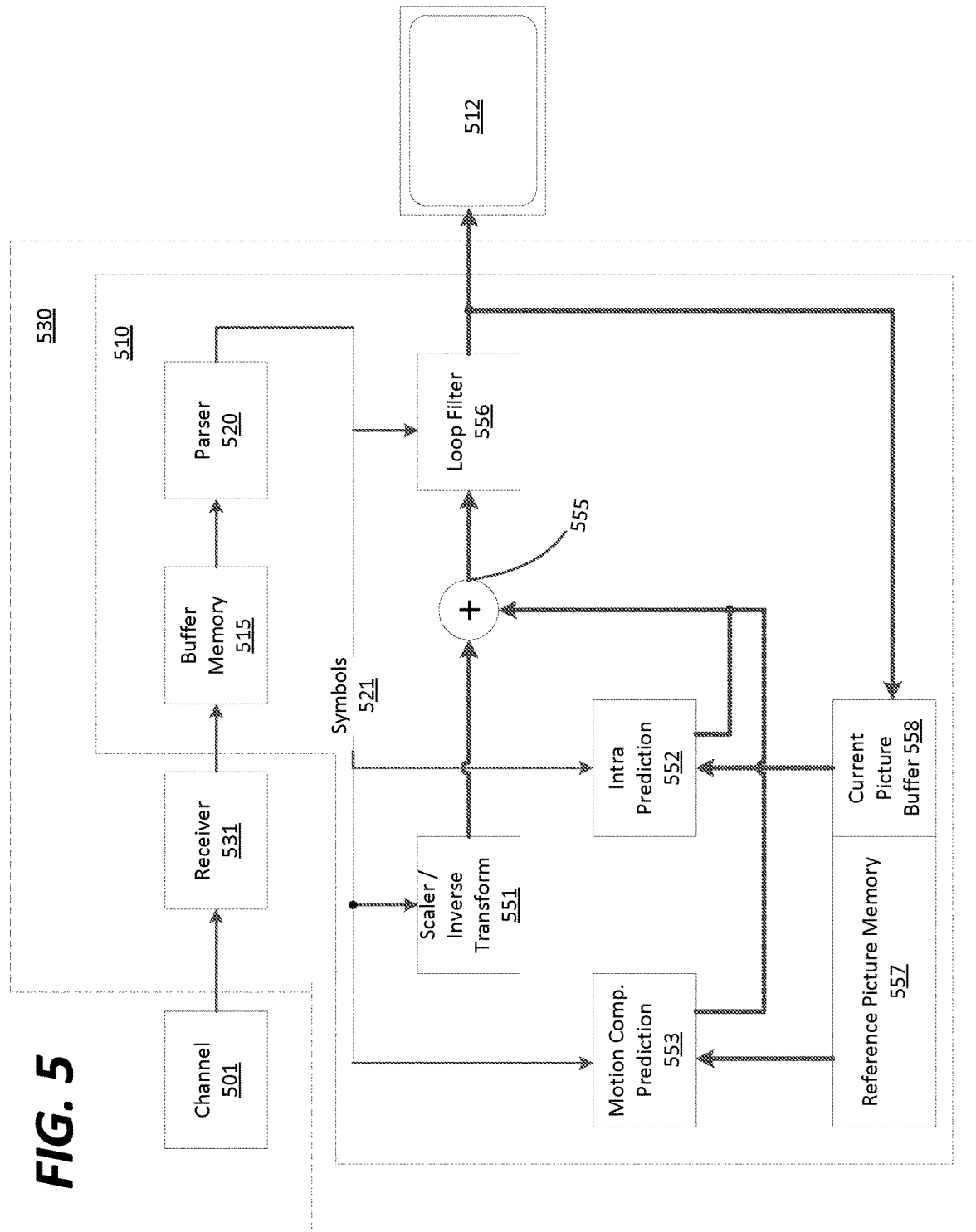
FIG. 5 is a schematic illustration of a simplified block diagram of a decoder in accordance with an embodiment.

FIG. 5 shows a block diagram of a video decoder 510 according to an embodiment of the present disclosure. The video decoder 510 can be included in an electronic device 530. The electronic device 530 can include a receiver 531 (e.g., receiving circuitry). The video decoder 510 can be used in the place of the video decoder 410 in the FIG. 4 example.

The receiver 531 may receive one or more coded video sequences to be decoded by the video decoder 510; in the same or another embodiment, one coded video sequence at a time, where the decoding of each coded video sequence is independent from other coded video sequences. The coded video sequence may be received from a channel 501, which may be a hardware/software link to a storage device which stores the encoded video data. The receiver 531 may receive the encoded video data with other data, for example, coded audio data and/or ancillary data streams, that may be forwarded to their respective using entities (not depicted). The receiver 531 may separate the coded video sequence from the other data. To combat network jitter, a buffer memory 515 may be coupled in between the receiver 531 and an entropy decoder/parser 520 ("parser 520" henceforth). In certain applications, the buffer memory 515 is part of the video decoder 510. In others, it can be outside of the video decoder 510 (not depicted). In still others, there can be a buffer memory (not depicted) outside of the video decoder 510, for example to combat network jitter, and in addition another buffer memory 515 inside the video decoder 510, for example to handle playout timing. When the receiver 531 is receiving data from a store/forward device of sufficient bandwidth and controllability, or from an isosynchronous network, the buffer memory 515 may not be needed, or can be small. For use on best effort packet networks such as the Internet, the buffer memory 515 may be required, can be comparatively large and can be advantageously of adaptive size, and may at least partially be implemented in an operating system or similar elements (not depicted) outside of the video decoder 510.

The video decoder 510 may include the parser 520 to reconstruct symbols 521 from the coded video sequence. Categories of those symbols include information used to manage operation of the video decoder 510, and potentially information to control a rendering device such as a render device 512 (e.g., a display screen) that is not an integral part of the electronic device 530 but can be coupled to the electronic device 540, as is shown in FIG. 5. The control information for the rendering device(s) may be in the form of Supplementary Enhancement Information (SEI messages) or Video Usability Information (VUI) parameter set fragments (not depicted). The parser 520 may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser 520 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 520 may also extract from the coded video sequence information such as transform coefficients, quantizer parameter values, motion vectors, and so forth.

The parser 520 may perform entropy decoding/parsing operation on the video sequence received from the buffer memory 515, so as to create symbols 521.

Reconstruction of the symbols 521 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 520. The flow of such subgroup control information between the parser 520 and the multiple units below is not depicted for clarity.

Beyond the functional blocks already mentioned, the video decoder 510 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 551. The scaler/inverse transform unit 551 receives a quantized transform coefficient as well as control information, including which transform to use, block size, quantization factor, quantization scaling matrices, etc., as symbol(s) 521 from the parser 520. The scaler/inverse transform unit 551 can output blocks comprising sample values, that can be input into aggregator 555.

In some cases, the output samples of the scaler/inverse transform 551 can pertain to an intra coded block; that is: a block that is not using predictive information from previously reconstructed pictures, but can use predictive information from previously reconstructed parts of the current picture. Such predictive information can be provided by an intra picture prediction unit 552. In some cases, the intra picture prediction unit 552 generates a block of the same size and shape of the block under reconstruction, using surrounding already reconstructed information fetched from the current picture buffer 558. The current picture buffer 558 buffers, for example, partly reconstructed current picture and/or fully reconstructed current picture. The aggregator 555, in some cases, adds, on a per sample basis, the prediction information the intra prediction unit 552 has generated to the output sample information as provided by the scaler/inverse transform unit 551.

In other cases, the output samples of the scaler/inverse transform unit 551 can pertain to an inter-coded, and potentially motion compensated block. In such a case, a motion compensation prediction unit 553 can access reference picture memory 557 to fetch samples used for prediction. After motion compensating the fetched samples in accordance with the symbols 521 pertaining to the block, these samples can be added by the aggregator 555 to the output of the scaler/inverse transform unit 551 (in this case called the residual samples or residual signal) so as to generate output sample information. The addresses within the reference picture memory 557 from where the motion compensation prediction unit 553 fetches prediction samples can be controlled by motion vectors, available to the motion compensation prediction unit 553 in the form of symbols 521 that can have, for example X, Y, and reference picture components. Motion compensation also can include interpolation of sample values as fetched from the reference picture memory 557 when sub-sample exact motion vectors are in use, motion vector prediction mechanisms, and so forth.

In other cases, the output samples of the scaler/inverse transform unit 551 can pertain to an inter coded, and potentially motion compensated block. In such a case, a motion compensation prediction unit 553 can access reference picture memory 557 to fetch samples used for prediction. After motion compensating the fetched samples in accordance with the symbols 521 pertaining to the block, these samples can be added by the aggregator 555 to the output of the scaler/inverse transform unit 551 (in this case called the residual samples or residual signal) so as to generate output sample information. The addresses within the reference picture memory 557 from where the motion compensation prediction unit 553 fetches prediction samples can be controlled by motion vectors, available to the motion compensation prediction unit 553 in the form of symbols 521 that can have, for example X, Y, and reference picture components. Motion compensation also can include interpolation of sample values as fetched from the reference picture memory 557 when sub-sample exact motion vectors are in use, motion vector prediction mechanisms, and so forth.

The output samples of the aggregator 555 can be subject to various loop filtering techniques in the loop filter unit 556. Video compression technologies can include in-loop filter technologies that are controlled by parameters included in the coded video sequence (also referred to as coded video bitstream) and made available to the loop filter unit 556 as symbols 521 from the parser 520, but can also be responsive to meta-information obtained during the decoding of previous (in decoding order) parts of the coded picture or coded video sequence, as well as responsive to previously reconstructed and loop-filtered sample values.

The output of the loop filter unit 556 can be a sample stream that can be output to the render device 512 as well as stored in the reference picture memory 557 for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser 520), the current picture buffer 558 can become a part of the reference picture memory 557, and a fresh current picture buffer can be reallocated before commencing the reconstruction of the following coded picture.

The video decoder 510 may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as document in the video compression technology or standard. Specifically, a profile can select a certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 531 may receive additional (redundant) data with the encoded video. The additional data may be included as part of the coded video sequence(s). The additional data may be used by the video decoder 510 to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
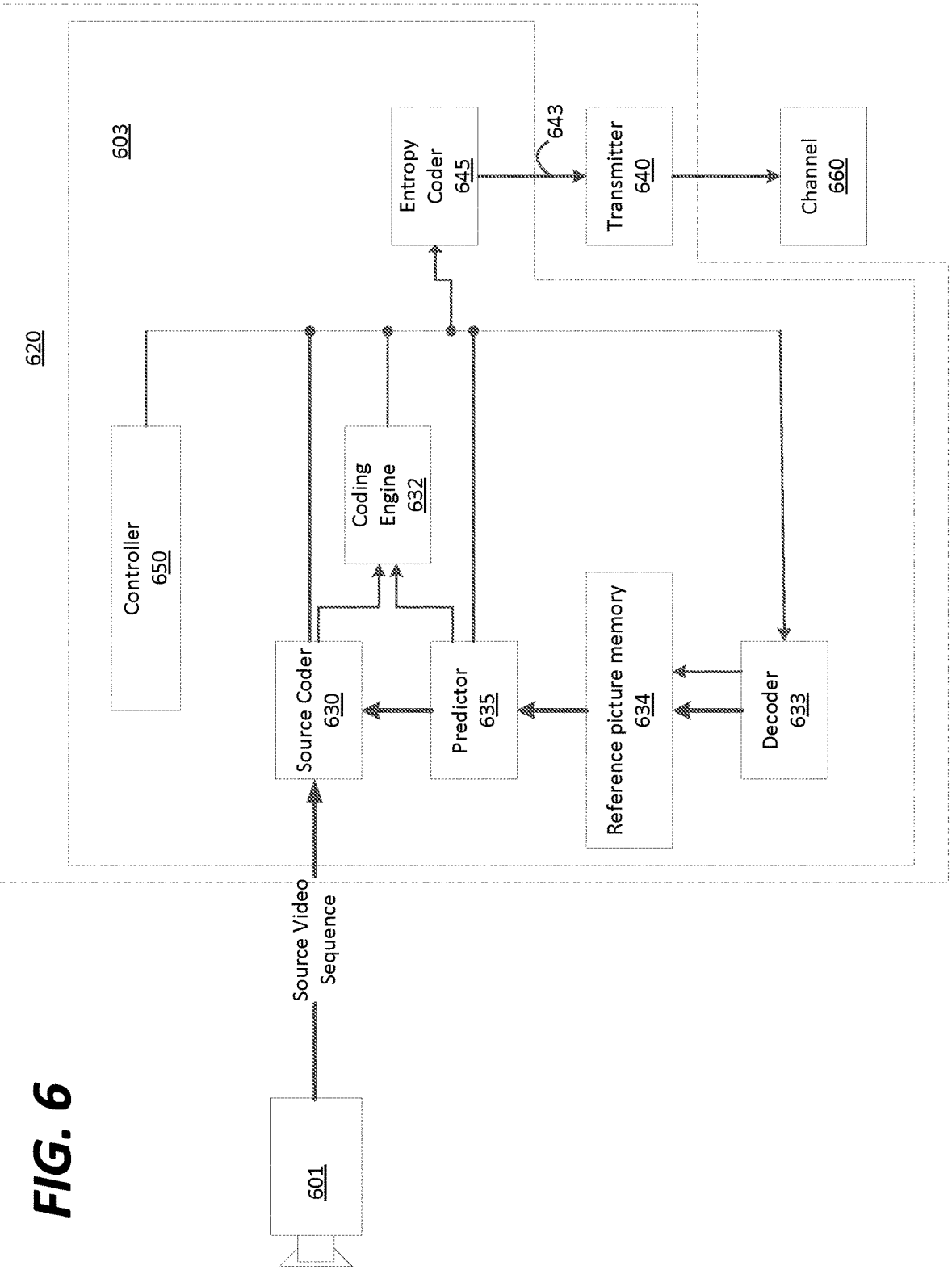
FIG. 6 is a schematic illustration of a simplified block diagram of an encoder in accordance with an embodiment.

FIG. 6 shows a block diagram of a video encoder 603 according to an embodiment of the present disclosure. The video encoder 603 is included in an electronic device 620. The electronic device 620 includes a transmitter 640 (e.g., transmitting circuitry). The video encoder 603 can be used in the place of the video encoder 403 in the FIG. 4 example.

The video encoder 603 may receive video samples from a video source 601 (that is not part of the electronic device 420 in the FIG. 4 example) that may capture video image(s) to be coded by the video encoder 603. In another example, the video source 601 is a part of the electronic device 620.

The video source 601 may provide the source video sequence to be coded by the video encoder 603 in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 601 may be a storage device storing previously prepared video. In a videoconferencing system, the video source 601 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focusses on samples.

According to an embodiment, the video encoder 603 may code and compress the pictures of the source video sequence into a coded video sequence 643 in real time or under any other time constraints as required by the application. Enforcing appropriate coding speed is one function of a controller 650. In some embodiments, the controller 650 controls other functional units as described below and is functionally coupled to the other functional units. The coupling is not depicted for clarity. Parameters set by the controller 650 can include rate control related parameters (picture skip, quantizer, lambda value of rate-distortion optimization techniques, . . . ), picture size, group of pictures (GOP) layout, maximum motion vector search range, and so forth. The controller 650 can be configured to have other suitable functions that pertain to the video encoder 603 optimized for a certain system design.

In some embodiments, the video encoder 603 is configured to operate in a coding loop. As an oversimplified description, in an example, the coding loop can include a source coder 630 (e.g., responsible for creating symbols, such as a symbol stream, based on an input picture to be coded, and a reference picture(s)), and a (local) decoder 633 embedded in the video encoder 603. The decoder 633 reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory 634. As the decoding of a symbol stream leads to bit-exact results independent of decoder location (local or remote), the content in the reference picture memory 634 is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder 633 can be the same as of a "remote" decoder, such as the video decoder 610, which has already been described in detail above in conjunction with FIG. 5. Briefly referring also to FIG. 5, however, as symbols are available and encoding/decoding of symbols to a coded video sequence by an entropy coder 545 and the parser 520 can be lossless, the entropy decoding parts of the video decoder 510, including the buffer memory 515, and parser 520 may not be fully implemented in the local decoder 633.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder 630 may perform motion compensated predictive coding, which codes an input picture predictively with reference to one or more previously-coded picture from the video sequence that were designated as "reference pictures". In this manner, the coding engine 632 codes differences between pixel blocks of an input picture and pixel blocks of reference picture(s) that may be selected as prediction reference(s) to the input picture.

The local video decoder 633 may decode coded video data of pictures that may be designated as reference pictures, based on symbols created by the source coder 630. Operations of the coding engine 632 may advantageously be lossy processes. When the coded video data may be decoded at a video decoder (not shown in FIG. 6), the reconstructed video sequence typically may be a replica of the source video sequence with some errors. The local video decoder 633 replicates decoding processes that may be performed by the video decoder on reference pictures and may cause reconstructed reference pictures to be stored in the reference picture cache 634. In this manner, the video encoder 603 may store copies of reconstructed reference pictures locally that have common content as the reconstructed reference pictures that will be obtained by a far-end video decoder (absent transmission errors).

The predictor 635 may perform prediction searches for the coding engine 632. That is, for a new picture to be coded, the predictor 635 may search the reference picture memory 634 for sample data (as candidate reference pixel blocks) or certain metadata such as reference picture motion vectors, block shapes, and so on, that may serve as an appropriate prediction reference for the new pictures. The predictor 635 may operate on a sample block-by-pixel block basis to find appropriate prediction references. In some cases, as determined by search results obtained by the predictor 635, an input picture may have prediction references drawn from multiple reference pictures stored in the reference picture memory 634.

The controller 650 may manage coding operations of the source coder 630, including, for example, setting of parameters and subgroup parameters used for encoding the video data.

Output of all aforementioned functional units may be subjected to entropy coding in the entropy coder 645. The entropy coder 645 translates the symbols as generated by the various functional units into a coded video sequence, by losslessly compressing the symbols according to technologies known to a person skilled in the art as, for example Huffman coding, variable length coding, arithmetic coding, and so forth.

The transmitter 640 may buffer the coded video sequence(s) as created by the entropy coder 645 to prepare for transmission via a communication channel 660, which may be a hardware/software link to a storage device which would store the encoded video data. The transmitter 640 may merge coded video data from the video coder 603 with other data to be transmitted, for example, coded audio data and/or ancillary data streams (sources not shown).

The controller 650 may manage operation of the video encoder 603. During coding, the controller 650 may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of Intra pictures, including, for example Independent Decoder Refresh ("IDR") Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference pictures. Blocks of B pictures may be coded predictively, via spatial prediction or via temporal prediction with reference to one or two previously coded reference pictures.

The video encoder 603 may perform coding operations according to a predetermined video coding technology or standard, such as ITU-T Rec. H.265. In its operation, the video encoder 603 may perform various compression operations, including predictive coding operations that exploit temporal and spatial redundancies in the input video sequence. The coded video data, therefore, may conform to a syntax specified by the video coding technology or standard being used.

In an embodiment, the transmitter 640 may transmit additional data with the encoded video. The source coder 630 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

A video may be captured as a plurality of source pictures (video pictures) in a temporal sequence. Intra-picture prediction (often abbreviated to Intra prediction) makes uses of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC (High Efficiency Video Coding) standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels and the like.

Figure 7:
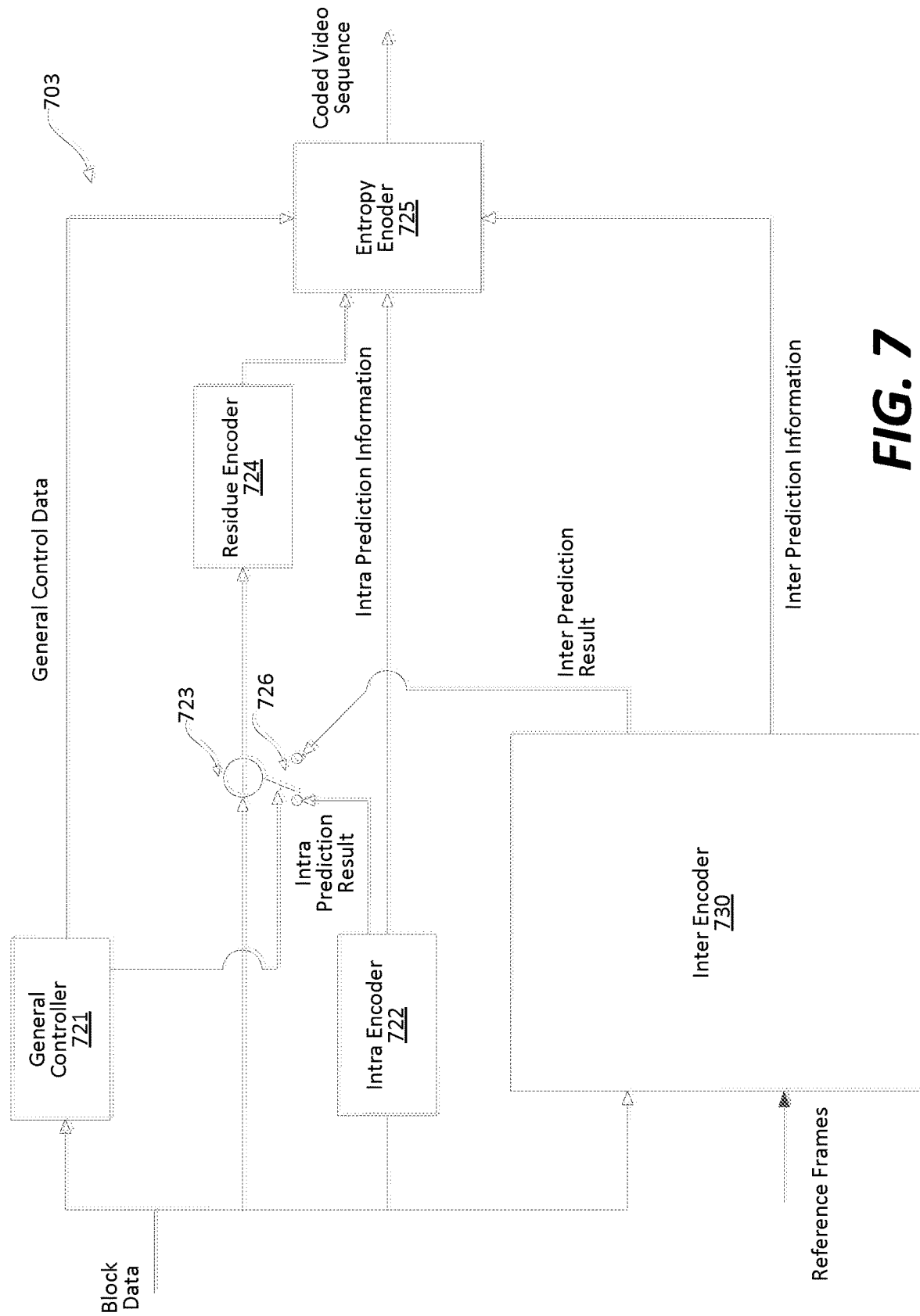
FIG. 7 is a block diagram of an encoder in accordance with another embodiment.

FIG. 7 shows a diagram of a video encoder 703 according to another embodiment of the disclosure. The video encoder 703 is configured to receive a processing block (e.g., a prediction block) of sample values within a current video picture in a sequence of video pictures, and encode the processing block into a coded picture that is part of a coded video sequence. In an example, the video encoder 703 is used in the place of the video encoder 403 in the FIG. 4 example.

In an HEVC example, the video encoder 703 receives a matrix of sample values for a processing block, such as a prediction block of 8×8 samples, and the like. The video encoder 703 determines whether the processing block is best coded using intra mode, inter mode, or bi-prediction mode using, for example, rate-distortion optimization. When the processing block is to be coded in intra mode, the video encoder 703 may use an intra prediction technique to encode the processing block into the coded picture; and when the processing block is to be coded in inter mode or bi-prediction mode, the video encoder 703 may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder 703 includes other components, such as a mode decision module (not shown) to determine the mode of the processing blocks.

In the FIG. 7 example, the video encoder 703 includes the inter encoder 730, an intra encoder 722, a residue calculator 723, a switch 726, a residue encoder 724, a general controller 721 and an entropy encoder 725 coupled together as shown in FIG. 7.

The inter encoder 730 is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique.

The intra encoder 722 is configured to receive the samples of the current block (e.g., a processing block), in some cases compare the block to blocks already coded in the same picture, generate quantized coefficients after transform and, in some cases also intra prediction information (e.g., an intra prediction direction information according to one or more intra encoding techniques).

The general controller 721 is configured to determine general control data and control other components of the video encoder 703 based on the general control data. In an example, the general controller 721 determines the mode of the block, and provides a control signal to the switch 726 based on the mode. For example, when the mode is the intra, the general controller 721 controls the switch 726 to select the intra mode result for use by the residue calculator 723, and controls the entropy encoder 725 to select the intra prediction information and include the intra prediction information in the bitstream; and when the mode is the inter mode, the general controller 721 controls the switch 726 to select the inter prediction result for use by the residue calculator 723, and controls the entropy encoder 725 to select the inter prediction information and include the inter prediction information in the bitstream.

The residue calculator 723 is configured to calculate a difference (residue data) between the received block and prediction results selected from the intra encoder 722 or the inter encoder 730. The residue encoder 724 is configured to operate based on the residue data to encode the residue data to generate the transform coefficients. In an example, the residue encoder 724 is configured to convert the residue data in the frequency domain, and generate the transform coefficients. The transform coefficients are then subject to quantization processing to obtain quantized transform coefficients.

The entropy encoder 725 is configured to format the bitstream to include the encoded block. The entropy encoder 725 is configured to include various information according to a suitable standard, such as HEVC standard. In an example, the entropy encoder 725 is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
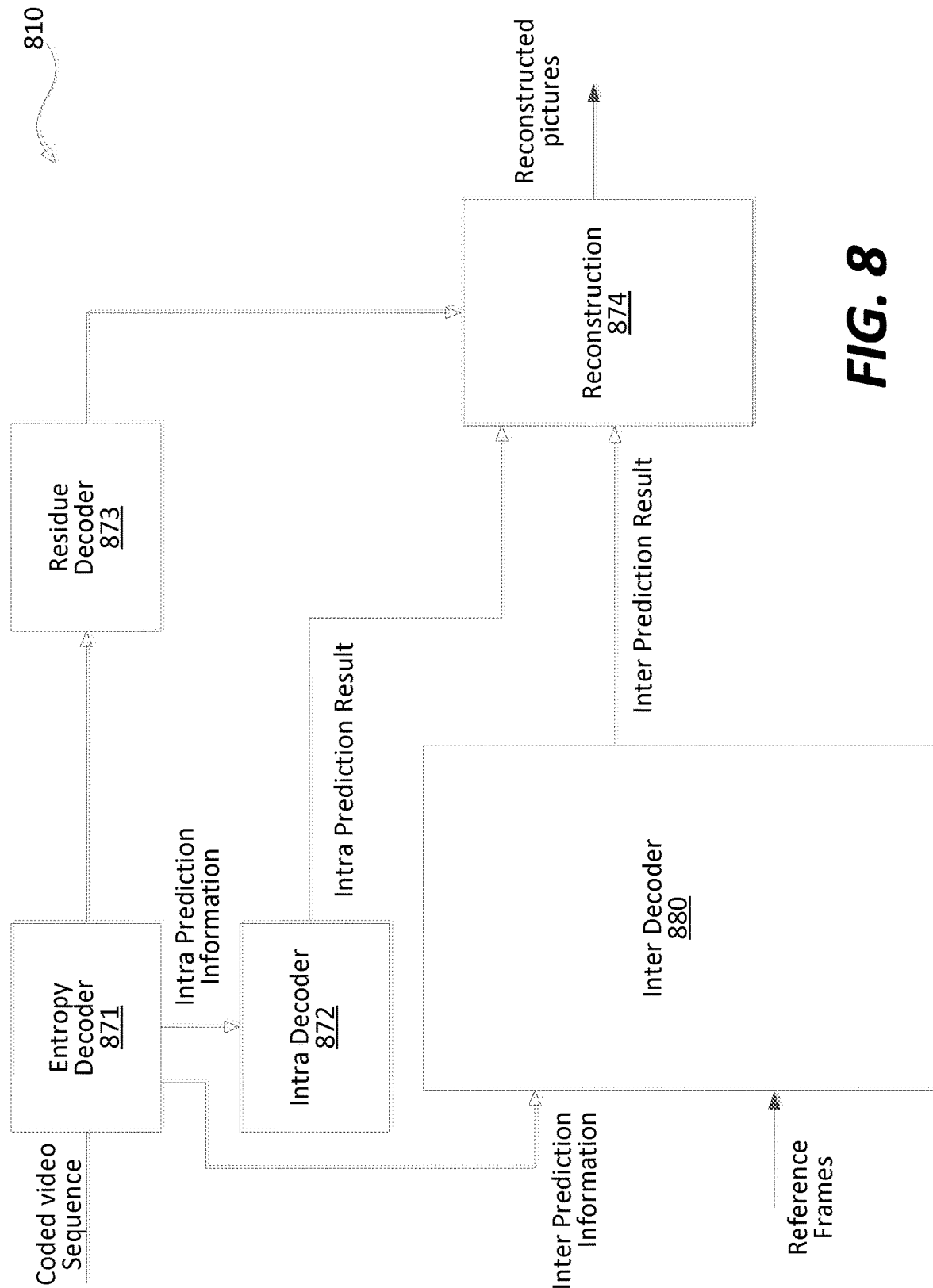
FIG. 8 is a block diagram of a decoder in accordance with another embodiment.

FIG. 8 shows a diagram of a video decoder 810 according to another embodiment of the disclosure. The video decoder 810 is configured to receive a coded pictures that are part of a coded video sequence, and decode the coded picture to generate a reconstructed picture. In an example, the video decoder 810 is used in the place of the video decoder 410 in the FIG. 4 example.

In the FIG. 8 example, the video decoder 810 includes an entropy decoder 871, an inter decoder 880, a residue decoder 873, a reconstruction module 874, and an intra decoder 872 coupled together as shown in FIG. 8.

The entropy decoder 871 can be configured to reconstruct, from the coded picture, certain symbols that represent the syntax elements of which the coded picture is made up. Such symbols can include, for example, the mode in which a block is coded (such as, for example, intra, inter, b-predicted, the latter two in merge submode or another submode), prediction information (such as, for example, intra prediction information or inter prediction information) that can identify certain sample or metadata that is used for prediction by the intra decoder 872 or the inter decoder 880 respectively residual information in the form of, for example, quantized transform coefficients, and the like. In an example, when the prediction mode is inter or bi-predicted mode, the inter prediction information is provided to the inter decoder 880; and when the prediction type is the intra prediction type, the intra prediction information is provided to the intra decoder 872. The residual information can be subject to inverse quantization and is provided to the residue decoder 873.

The inter decoder 880 is configured to receive the inter prediction information, and generate inter prediction results based on the inter prediction information.

The intra decoder 872 is configured to receive the intra prediction information, and generate prediction results based on the intra prediction information.

The residue decoder 873 is configured to perform inverse quantization to extract de-quantized transform coefficients, and process the de-quantized transform coefficients to convert the residual from the frequency domain to the spatial domain. The residue decoder 873 may also require certain control information (to include the Quantizer Parameter QP), and that information may be provided by the entropy decoder 871 (datapath not depicted as this may be low volume control information only).

The reconstruction module 874 is configured to combine, in the spatial domain, the residual as output by the residue decoder 873 and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders 403, 603 and 703, and the video decoders 410, 510 and 810 can be implemented using any suitable technique. In an embodiment, the video encoders 403, 603 and 703, and the video decoders 410, 510 and 810 can be implemented using one or more integrated circuits. In another embodiment, the video encoders 403, 603 and 703, and the video decoders 410, 510 and 810 can be implemented using one or more processors that execute software instructions.

In the decoding method according to a first embodiment of the disclosure, wide angles beyond the range of prediction directions covered by conventional intra prediction modes are used, which are called wide angular intra prediction modes. These wide angles are only applied for non-square blocks. Angles going beyond 45 degree in the top-right direction (intra prediction mode 34 in HEVC) are used if the block width is larger than block height. Angles going beyond 45 degree in the bottom-left direction (intra prediction mode 2 in HEVC) are used if the block height is larger than block width. Mode 2 is referred to as the bottom-left diagonal mode and Mode 34 is referred to as the top-right diagonal mode when 35 HEVC intra prediction modes are applied.

As described in U.S. Provisional Application Nos. 62/679,664, 62/693,050, 62/693,046, which are incorporated herein by reference in their entirety, for non-square blocks, several conventional angular intra prediction modes are replaced with wide angular modes. The replaced modes are signaled using the original method and remapped to the indices of wide angular modes after parsing. The total number of intra prediction modes is unchanged, i.e., 35 as in VVC Test Model (VTM)-1.0, or 67 as in BMS-1.0, and the intra mode coding is unchanged.

In the case of 35 intra prediction modes, the replaced intra prediction modes are illustrated in below Table 1.

TABLE 1

| Condition | Replaced intra prediction modes |
| --- | --- |
| W/H == 2 | Modes 2, 3, 4 |
| W/H > 2 | Modes 2, 3, 4, 5, 6 |
| W/H == 1 | None |
| H/W == 1/2 | Modes 32, 33, 34 |
| H/W < 1/2 | Modes 30, 31, 32, 33, 34 |

In the case of 67 intra prediction modes, the replaced intra prediction modes are illustrated in below Table 2.

TABLE 2

| Condition | Replaced intra prediction modes |
| --- | --- |
| W/H == 2 | Modes 2, 3, 4, 5, 6, 7 |
| W/H > 2 | Modes 2, 3, 4, 5, 6, 7, 8, 9, 10, 11 |
| W/H == 1 | None |
| H/W == 1/2 | Modes 61, 62, 63, 64, 65, 66 |
| H/W < 1/2 | Mode 57, 58, 59, 60, 61, 62, 63, 64, 65, 66 |

As indicated in Table 2, up to 10 modes are replaced by wide angle modes beyond the diagonal directions.

Figure 9:
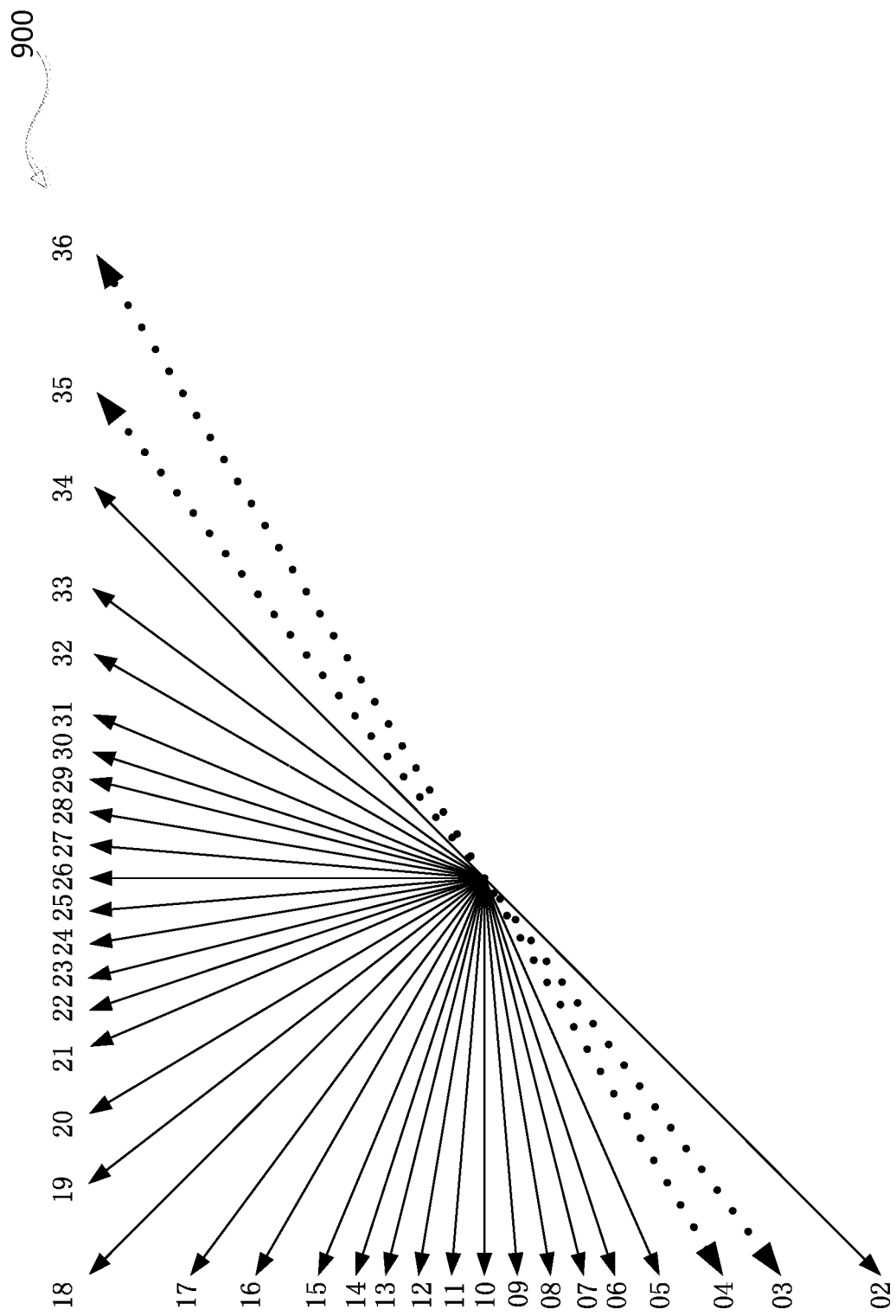
FIG. 9 is a diagram illustrating exemplary wide angle modes.

FIG. 9 shows an example of how angular intra modes are replaced with wide angular modes for non-square blocks. In this example, mode 2 and mode 3 are replaced with wide angle mode 35 and mode 36, respectively, where the direction of mode 35 is pointing to the opposite direction of mode 3, and the direction of mode 36 is pointing to the opposite direction of mode 4.

An intra sample substitution process is used in HEVC. The intra sample substitution process of intra mode is described in below, which includes reference sample substitution process, filtering process of neighboring process, and intra prediction process.

Inputs to this process are:
reference samples p[x][y] with x=−1, y=−1 . . . nTbS*2−1 and x=0 . . . nTbS*2−1, y=−1 for intra sample prediction, a transform block size nTbS, a variable cIdx specifying the color component of the current block.

Outputs of this process are the modified reference samples p[x][y] with x=−1, y=−1 . . . nTbS*2−1 and x=0 . . . nTbS*2−1, y=−1 for intra sample prediction.

The variable bitDepth is derived as follows:
If cIdx is equal to 0, bitDepth is set equal to BitDepthY.
Otherwise, bitDepth is set equal to BitDepthC.

The values of the samples p[x][y] with x=−1, y=−1 . . . nTbS*2−1 and x=0 . . . nTbS*2−1, y=−1 are modified as follows:
If all samples p[x][y] with x=−1, y=−1 . . . nTbS*2−1 and x=0 . . . nTbS*2−1, y=−1 are marked as "not available for intra prediction", the value 1<<(bitDepth−1) is substituted for the values of all samples p[x][y].
Otherwise (at least one but not all samples p[x][y] are marked as "not available for intra prediction"), the following ordered steps are performed:
1. When p[−1][nTbS*2−1] is marked as "not available for intra prediction", search sequentially starting from x=−1, y=nTbS*2−1 to x=−1, y=−1, then from x=0, y=−1 to x=nTbS*2−1, y=−1. Once a sample p[x][y] marked as "available for intra prediction" is found, the search is terminated and the value of p[x][y] is assigned to p[−1][nTbS*2−1].
2. Search sequentially starting from x=−1, y=nTbS*2−2 to x=−1, y=−1, when p[x][y] is marked as "not available for intra prediction", the value of p[x][y+1] is substituted for the value of p[x][y].
3. For x=0 . . . nTbS*2−1, y=−1, when p[x][y] is marked as "not available for intra prediction", the value of p[x−1][y] is substituted for the value of p[x][y].

All samples p[x][y] with x=−1, y=−1 . . . nTbS*2−1 and x=0 . . . nTbS*2−1, y=−1 are marked as "available for intra prediction".

Neighboring samples are filtered. Inputs to this process are as follows:
the neighboring samples p[x][y], with x=−1, y=−1 . . . nTbS*2−1 and x=0 . . . nTbS*2−1, y=−1,
a variable nTbS specifying the transform block size.

Outputs of this process are the filtered samples pF[x][y], with x=−1, y=−1 . . . nTbS*2−1 and x=0 . . . nTbS*2−1, y=−1. The variable filterFlag is derived as follows:
If one or more of the following conditions are true, filterFlag is set equal to 0:
predModeIntra is equal to INTRA_DC.
nTbS is equal 4.
Otherwise, the following applies:
The variable minDistVerHor is set equal to Min(Abs (predModeIntra−26), Abs(predModeIntra−10)).
The variable intraHorVerDistThres[nTbS] is specified in Table 8 3.
The variable filterFlag is derived as follows:
If minDistVerHor is greater than intraHorVerDist-Thres[nTbS], filterFlag is set equal to 1.
Otherwise, filterFlag is set equal to 0.

Table 3 below specifies intraHorVertDistThres[nTbbS] for various transform block sizes.

TABLE 3

|  | nTbS = 8 | nTbS = 16 | nTbS = 32 |
|---|---|---|---|
| intraHorVerDistThres[nTbS] | 7 | 1 | 0 |

When filterFlag is equal to 1, the following applies:
The variable biIntFlag is derived as follows:
If all of the following conditions are true, biIntFlag is set equal to 1:
strong intra smoothing enabled flag is equal to 1
nTbS is equal to 32

$$\text{Abs}(p[-1][-1]+p[nTbS*2-1][-1]-2*p[nTbS-1][-1]) < (1<<(\text{BitDepth}Y-5))$$

$$\text{Abs}(p[-1][-1]+p[-1][nTbS*2-1]-2*p[-1][nTbS-1]) < (1<<(\text{BitDepth}Y-5))$$

Otherwise, biIntFlag is set equal to 0.

The filtering is performed as follows:
If biIntFlag is equal to 1, the filtered sample values pF[x][y] with x=−1, y=−1 . . . 63 and x=0 . . . 63, y=−1 are derived as follows:

$$pF[-1][-1]=p[-1][-1]$$

$$pF[-1][y]=((63-y)*p[-1][-1]+(y+1)*p[-1][63]+32)>>6 \text{ for } y=0 \ldots 62 \quad (8\text{-}31)$$

$$pF[-1][63]=p[-1][63]$$

$$pF[x][-1]=((63-x)*p[-1][-1]+(x+1)*p[63][-1]+32)>>6 \text{ for } x=0 \ldots 62 \quad (8\text{-}33)$$

$$pF[63][-1]=p[63][-1]$$

Otherwise (biIntFlag is equal to 0), the filtered sample values pF[x][y] with x=−1, y=−1 . . . nTbS*2−1 and x=0 . . . nTbS*2−1, y=−1 are derived as follows:

$$pF[-1][-1]=(p[-1][0]+2*p[-1][-1]+p[0][-1]+2)>>2$$

$$pF[-1][y]=(p[-1][y+1]+2*p[-1][y]+p[-1][y-1]+2)>>2 \text{ for } y=0 \ldots nTbS*2-2$$

$$pF[-1][nTbS*2-1]=p[-1][nTbS*2-1]$$

$$pF[x][-1]=(p[x-1][-1]+2*p[x][-1]+p[x+1][-1]+2)>>2 \text{ for } x=0 \ldots nTbS*2-2$$

$$pF[nTbS*2-1][-1]=p[nTbS*2-1][-1]$$

The intra prediction mode is specified in the range of INTRA_ANGULAR2 to INTRA_ANGULAR34. Inputs to this process are
the intra prediction mode predModeIntra,
the neighboring samples p[x][y], with x=−1, y=−1 . . . nTbS*2−1 and x=0 . . . nTbS*2−1, y=−1,
a variable nTbS specifying the transform block size, and
a variable cIdx specifying the color component of the current block.

Outputs of this process are the predicted samples pred-Samples[x][y], with x, y=0 . . . nTbS−1.

Figure 10:
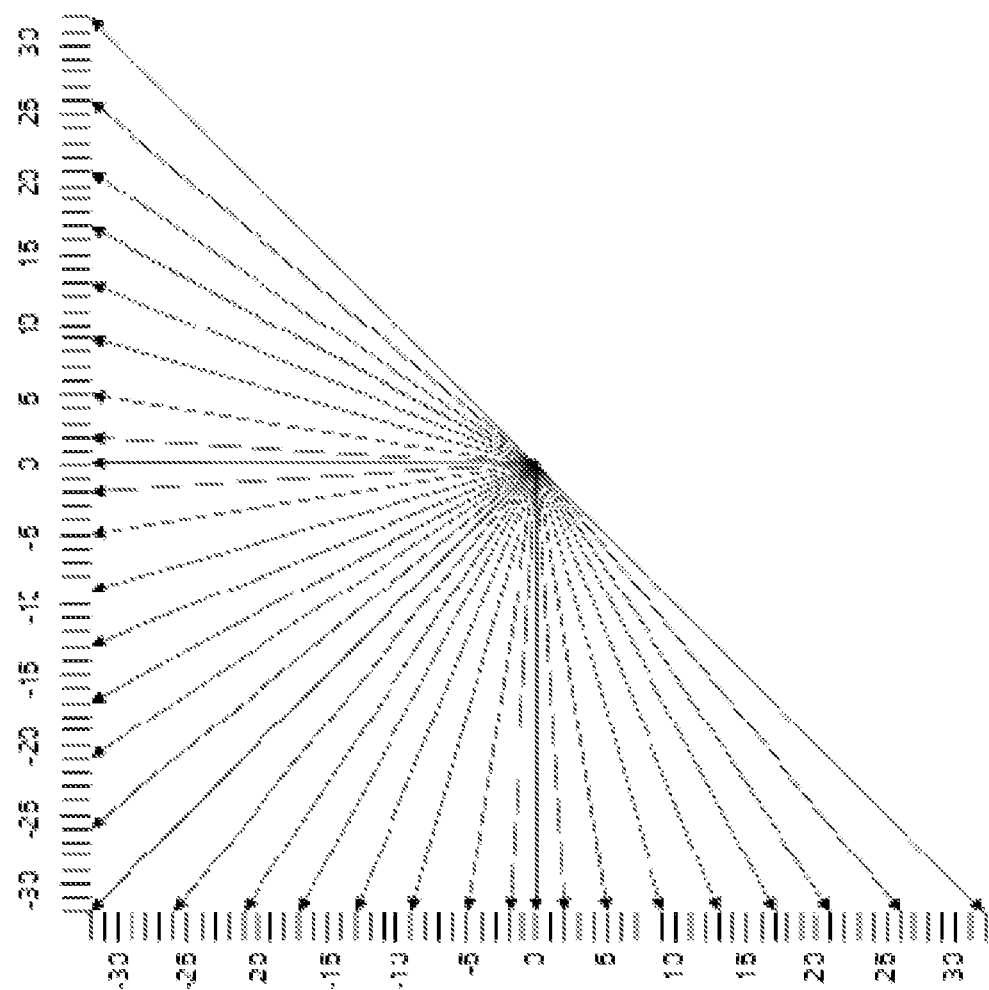
FIG. 10 is a diagram illustrating exemplary intra prediction angle definition.

FIG. 10 illustrates the 33 intra angles and Table 4 specifies the mapping between predModeIntra (pMI) and the angle parameter intraPredAngle (iPA).

TABLE 4

| | pMI | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| iPA | — | 32 | 26 | 21 | 17 | 13 | 9 | 5 | 2 | 0 | −2 | −5 | −9 | −13 | −17 | −21 | −26 |

| | pMI | | | | | | | | | | | | | | | | |
|---|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 | 34 |
| iPA | −32 | −26 | −21 | −17 | −13 | −9 | −5 | −2 | 0 | 2 | 5 | 9 | 13 | 17 | 21 | 26 | 32 |

As illustrated by FIG. 10, the intraPredAngle is a value indicating a predetermined distance measure from the vertical or horizontal mode. A smaller absolute value of intraPredAngle indicates a smaller distance to the vertical or horizontal mode.

Table 5 specifies the relationship between predModeIntra and the inverse angle parameter invAngle.

TABLE 5

| | predModeIntra | | | | | | | |
|---|---|---|---|---|---|---|---|---|
| | 11 | 12 | 13 | 14 | 15 | 16 | 17 | 18 |
| invAngle | −4096 | −1638 | −910 | −630 | −482 | −390 | −315 | −256 |

| | predModeIntra | | | | | | | |
|---|---|---|---|---|---|---|---|---|
| | 19 | 20 | 21 | 22 | 23 | 24 | 25 | 26 | |
| invAngle | −315 | −390 | −482 | −630 | −910 | −1638 | −4096 | — |

The values of the prediction samples predSamples[x][y], with x, y=0 ... nTbS−1 are derived as follows:

If predModeIntra is equal or greater than 18, the following ordered steps apply:
1. The reference sample array ref[x] is specified as follows:

ref[x]=p[−1+x][−1], with x=0 ... nTbS

If intraPredAngle is less than 0, the main reference sample array is extended as follows:
   When (nTbS*intraPredAngle)>>5 is less than −1,
      ref[x]=p[−1][−1+((x*invAngle+128)>>8)], with
         x=−1 ... (nTbS*intraPredAngle)>>5.

Otherwise, ref[x]=p[−1+x][−1], with x=nTbS+1 ... 2*nTbS.

2. The values of the prediction samples predSamples[x][y], with x, y=0 ... nTbS−1 are derived as follows:
   a. The index variable iIdx and the multiplication factor iFact are derived as follows:

iIdx=((y+1)*intraPredAngle)>>5 iFact=((y+1)*intraPredAngle)& 31 b. Depending on the value of iFact, the following applies:
      If iFact is not equal to 0, the value of the prediction samples predSamples[x][y] is derived as follows:

predSamples[x][y]=((32−iFact)*ref[x+iIdx+1]+
         iFact*ref[x+iIdx+2]+16)>>5

Otherwise, the value of the prediction samples predSamples[x][y] is derived as follows:

predSamples[x][y]=ref[x+iIdx+1]

c. When predModeIntra is equal to 26 (vertical), cIdx is equal to 0 and nTbS is less than 32, the following filtering applies with x=0, y=0 ... nTbS−1:

predSamples[x][y]=Clip1Y(p[x][−1]+((p[−1][y]−p[−1]
         [−1])>>1)),

Otherwise (predModeIntra is less than 18), the following ordered steps apply:
   1. The reference sample array ref[x] is specified as follows:
      The following applies:

ref[x]=p[−1][−1+x], with x=0 ... nTbS

If intraPredAngle is less than 0, the main reference sample array is extended as follows:
      When (nTbS*intraPredAngle)>>5 is less than −1, ref[x]=p[−1+((x*invAngle+128)>>8)][−1], with
         x=−1 ... (nTbS*intraPredAngle)>>5

Otherwise, ref[x]=p[−1][−1+x], with x=nTbS+1 ... 2*nTbS

2. The values of the prediction samples predSamples[x][y], with x, y=0 ... nTbS−1 are derived as follows:
   a. The index variable iIdx and the multiplication factor iFact are derived as follows:

iIdx=((x+1)*intraPredAngle)>>5 iFact=((x+1)*intraPredAngle)& 31 b. Depending on the value of iFact, the following applies:
      If iFact is not equal to 0, the value of the prediction samples predSamples[x][y] is derived as follows:

predSamples[x][y]=((32−iFact)*ref[y+iIdx+1]+
         iFact*ref[y+iIdx+2]+16)>>5

Otherwise, the value of the prediction samples predSamples[x][y] is derived as follows:

predSamples[x][y]=ref[y+iIdx+1]

c. When predModeIntra is equal to 10 (horizontal), cIdx is equal to 0 and nTbS is less than 32, the following filtering applies with x=0 ... nTbS−1, y=0:

predSamples[x][y]=Clip1Y(p[−1][y]+((p[x][−1]−p[−1]
         [−1])>>1)).

Figures 11A, 11B:
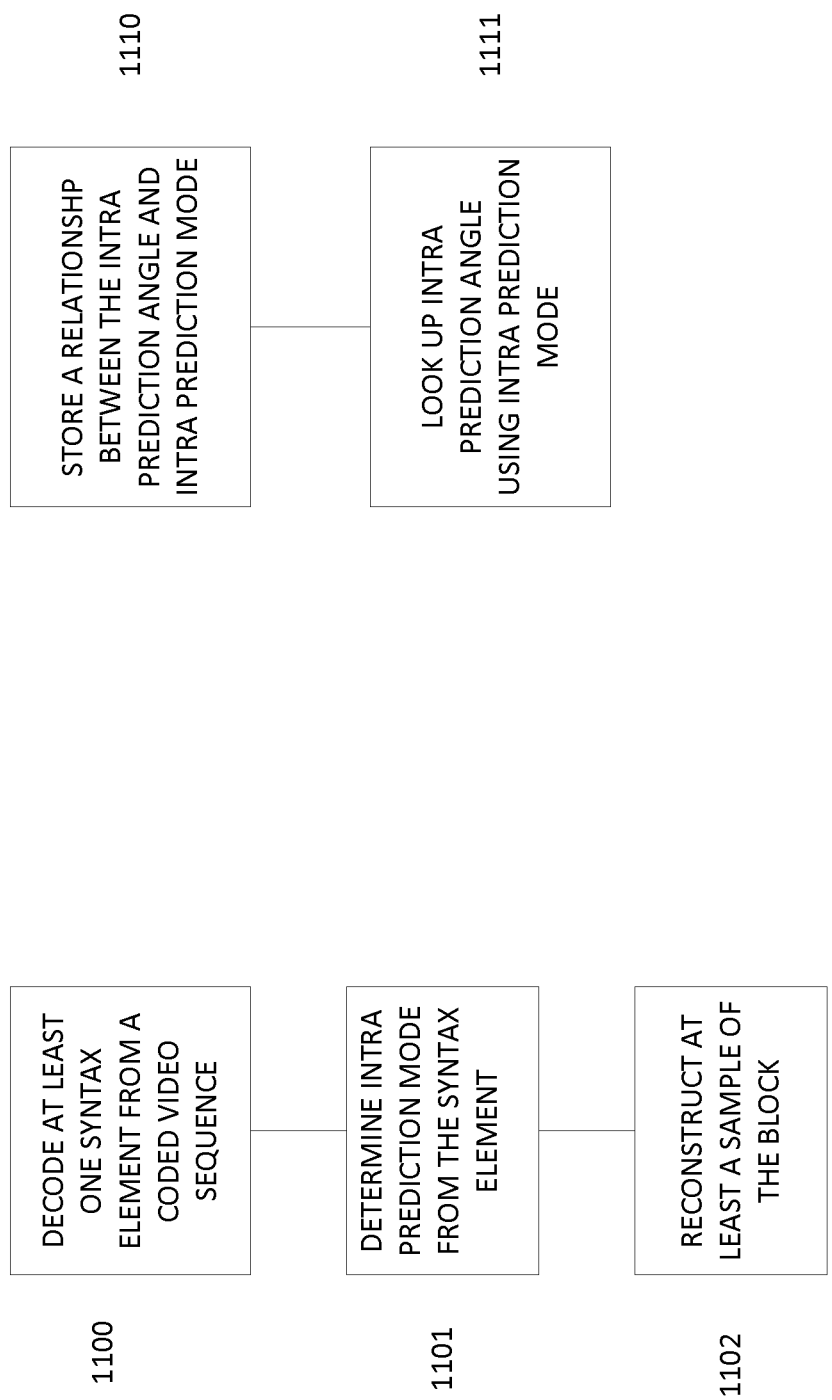
FIGS. 11A and 11B are diagrams of a method according to an embodiment of the invention.

In the first embodiment of the method of decoding according to the disclosure shown in FIGS. 11A and 11B, wide angle modes are included in specifying the relationship between predModeIntra and intraPredAngle. Up to ten additional wide angle modes are added beyond the diagonal directions. The relationship is specified as set forth in Table 6 which may be implemented as a lookup table.

TABLE 6

| pMI | -10 | -9 | -8 | -7 | -6 | -5 | -4 | -3 | -2 | -1 | 0 | 1 | 2 | 3 | 4 | 5 | 6 |
|---|---|---|---|---|---|---|---|---|---|---|---|---|---|---|---|---|---|
| iPA | 114 | 93 | 79 | 68 | 60 | 54 | 49 | 45 | 39 | 35 | — | — | 32 | 29 | 26 | 23 | 21 |

| pMI | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|
| iPA | 19 | 17 | 15 | 13 | 11 | 9 | 7 | 5 | 3 | 2 | 1 | 0 | -1 | -2 | -3 | -5 | -7 |

| pMI | 24 | 25 | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|---|---|
| iPA | -9 | -11 | -13 | -25 | -17 | -19 | -21 | -23 | -26 | -29 | -32 | -29 | -26 | -23 | -21 | -19 | -17 |

| pMI | 41 | 42 | 43 | 44 | 45 | 46 | 47 | 48 | 49 | 50 | 51 | 52 | 53 | 54 | 55 | 56 | 57 |
|---|---|---|---|---|---|---|---|---|---|---|---|---|---|---|---|---|---|
| iPA | -15 | -13 | -11 | -9 | -7 | -5 | -3 | -2 | -1 | 0 | 1 | 2 | 3 | 5 | 7 | 9 | 11 |

| pMI | 58 | 59 | 60 | 61 | 62 | 63 | 64 | 65 | 66 | 67 | 68 | 69 | 70 | 71 | 72 | 73 | 74 |
|---|---|---|---|---|---|---|---|---|---|---|---|---|---|---|---|---|---|
| iPA | 13 | 15 | 17 | 19 | 21 | 23 | 26 | 29 | 32 | 35 | 39 | 45 | 49 | 54 | 60 | 68 | 79 |

| pMI | 75 | 76 |
|---|---|---|
| iPA | 93 | 114 |

The ten intra modes below 0 are indicated as −1 to −10 while the ten modes above 66 are indicated as 67-76. The values for the added angles range from 35 to 114.

In step 1100, one or more syntax elements are decoded from a video sequence. In the example of FIG. 8, entropy decoder 871 decodes certain symbols that represent the syntax elements of which the coded picture is made up from a coded video sequence. Intra decoder 872 produces a prediction result. Such symbols can include, for example, prediction information and the intra prediction mode can be determined. From the relationship shown in Table 6, the intra prediction angle is determined from the intra prediction mode (Step 1101). A sample of the block is reconstructed using the determined intra prediction angle (Step 1102). For example, the reconstruction module 874 reconstructs the sample of the block.

The relationship between the intra prediction angle and the intra prediction mode can be stored in a look up table (step 1110), for example in the reconstruction module 874. The intra prediction angle can be determined from the look up table using the determined intra prediction mode (step 1111).

The method can be applied to reconstructing at least one sample of a non-square block and square blocks using the relationship between the intra prediction mode and the intra prediction angle. The non-square blocks use the wide angle modes.

In further embodiment of the method according to the disclosure, the predModeIntra and intraPredAngle values are modified. In these further embodiments, the block height is given as TbW and the block width is given as TbH. In a second embodiment, the values of predModeIntra and wideAngle are modified as follows:
    If nTbW>nTbH and intraPredAngle>((32*nTbH/nTbW)+1) and predModeIntra<34
        If intraPredAngle>9, predModeIntra=predModeIntra+65, and intra smoothing is performed;
        Otherwise, predModeIntra=66,
    If nTbH>nTbW and intraPredAngle>((32*nTbW/nTbH)+1) and predModeIntra>34
        If intraPredAngle>9, predModeIntra=predModeIntra−67, and intra smoothing is performed;
        Otherwise, predModeIntra=2.

In a third embodiment, the values of predModeIntra and wideAngle are modified as follows:
    If nTbW>nTbH and intraPredAngle>((32*nTbH/nTbW)+1) and predModeIntra<34
        If intraPredAngle>9, predModeIntra=predModeIntra+65, and intra smoothing is performed;
        Otherwise, predModeIntra=68−predModeIntra,
    If nTbH>nTbW and intraPredAngle>((32*nTbW/nTbH)+1) and predModeIntra>34
        If intraPredAngle>9, predModeIntra=predModeIntra−67, and intra smoothing is performed;
        Otherwise, predModeIntra=68−predModeIntra.

In a fourth embodiment, the values of predModeIntra and wideAngle are modified as follows:
    If nTbW>nTbH and intraPredAngle>((32*nTbH/nTbW)+1) and predModeIntra<34
        If intraPredAngle>9, predModeIntra=predModeIntra+65, and intra smoothing is performed;
        Otherwise, predModeIntra=76,
    If nTbH>nTbW and intraPredAngle>((32*nTbW/nTbH)+1) and predModeIntra>34
        If intraPredAngle>9, predModeIntra=predModeIntra−67, and intra smoothing is performed;
        Otherwise, predModeIntra=−10.

In a fourth embodiment, the values of predModeIntra and wideAngle are modified as follows:
  If nTbW>nTbH and intraPredAngle>((32*nTbH/nTbW)+1) and predModeIntra<34, and intra smoothing is performed;
    If intraPredAngle>9, predModeIntra=predModeIntra+65;
    Otherwise, predModeIntra=68−predModeIntra,
  If nTbH>nTbW and intraPredAngle>((32*nTbW/nTbH)+1) and predModeIntra>34, and intra smoothing is performed;
    If intraPredAngle>9, predModeIntra=predModeIntra−67;
    Otherwise, predModeIntra=68−predModeIntra.

The following describes further embodiments of the disclosure. The described methods may be used separately or combined in any order. Further, the embodiments may be implemented by processing circuitry (e.g., one or more processors or one or more integrated circuits). In one example, the one or more processors execute a program that is stored in a non-transitory computer-readable medium.

In the following, if block width is equal to or larger than block height, the top row is called long side and the left column is called the short side. Otherwise, the top row is called the short side and left column is called the long side. The block width is indicated by nWidth (or nTbW) and the block height is indicated by nHeight (or nTbH).

When padding an array/buffer of N reference samples, it means the reference sample values are either filled by the neighboring reconstructed samples located at the associated position of reference samples, or copied from reference samples that have already been filled, or derived from reference samples that have already been filled using a pre-defined function (e.g., linear extrapolation).

Given a set of all available intra prediction directions, for a particular block size W×H, it is constrained that only a pre-defined range (or group, or number) of reference samples can be used for intra prediction, and any intra prediction direction S, which uses reference samples outside the range of the pre-defined range (or group, or number) of reference samples, is mapped to a different intra prediction direction X. Several embodiments follow.

In one embodiment, the mapped intra prediction direction X is included in the set of all available intra prediction directions.

In another embodiment, the mapped intra prediction direction X does not use reference samples outside the range of the pre-defined range (or group, or number) of reference samples.

In a further embodiment, the pre-defined range (or group, or number) of reference samples include 2*W+N top neighboring reference samples and 2*H+M left neighboring reference samples. Example values of M and N include 1, 2, 3, 4, . . . 128.

In another embodiment, X is the diagonal intra prediction direction. For example, when 33 angular intra prediction modes are applied, S is mapped to 2 or 34 (as specified in above Table 5). For another example, when 65 angular intra prediction modes are applied, S is mapped to 2 or 66. For another example, when W>H, X is mapped to mode 34 (when 33 angular intra prediction modes are applied) or 66 (when 65 angular intra prediction modes are applied). For another example, when W<H, X is mapped to mode 2.

In yet another embodiment, S=K−X, where K is a pre-defined constant value. Example values are 36 (when 33 angular intra prediction modes are applied) and 68 (when 65 angular intra prediction modes are applied).

In one further embodiment, X is the widest intra prediction angle (with the largest index or the smallest index) within the set of all available intra prediction directions.

In another embodiment, X is a pre-defined intra prediction mode. Example pre-defined intra prediction modes include: horizontal, vertical, planar and DC prediction modes.

In a further embodiment, S is mapped to one of the intra prediction direction X of the set of all available intra prediction directions, however, the intra smoothing is applied differently. For example, if intra smoothing is not applied on intra prediction direction X, after S is mapped to intra prediction direction X, intra smoothing is applied. For another example, if intra smoothing is applied on intra prediction direction X, after S is mapped to intra prediction direction X, intra smoothing is not applied.

For rectangular blocks, whether intra smoothing is applied depends on block width and/or height, instead of block area size. Several embodiments using this concept are described below.

In one embodiment, when the Planar mode is used, whether intra smoothing is applied on the top neighboring reference samples depends on the block width, and whether intra smoothing is applied on the left neighboring reference samples depends on the block height.

In another embodiment, when angular mode is used, whether intra smoothing is applied on the top neighboring reference samples depends on the block width, and whether intra smoothing is applied on the left neighboring reference samples depends on the block height. In an example, two tables (shown below) are used to decide whether intra smoothing is applied. The following table 7 is used to decide whether intra smoothing is applied on the left reference samples given the block height and intra mode ipred, when Abs(ipred−HOR_IDX) is larger than intraVerDistThres[nTbH], intra smoothing is applied on the left reference samples, otherwise, it is not applied. HOR_IDX indicates the intra mode index of horizontal intra prediction, it is 10 when 33 angular modes are applied, it is 18 when 65 angular modes are applied. The threshold values in the following table are applied when 65 angular modes are applied.

TABLE 7

|  | nTbH = 4 | nTbH = 8 | nTbH = 16 | nTbH = 32 | nTbH =64 |
| --- | --- | --- | --- | --- | --- |
| intraVerDistThres[nTbH] | 20 | 14 | 2 | 0 | 20 |

Table 8 below is used to decide whether intra smoothing is applied on the top reference samples given the block height and intra mode ipred, when Abs(ipred−VER_IDX) is larger than intraVerDistThres[nTbW], intra smoothing is applied on the top reference samples, otherwise, it is not applied. VER_IDX indicates the intra mode index of horizontal intra prediction, it is 26 when 33 angular modes are applied, and it is 50 when 65 angular modes are applied. The threshold values in the following table are applied when 65 angular modes are applied.

TABLE 8

| | nTbW = 4 | nTbW = 8 | nTbW = 16 | nTbW = 32 | nTbW = 64 |
|---|---|---|---|---|---|
| intraHorDistThres[nTbW] | 16 | 14 | 2 | 0 | 16 |

In another aspect of the embodiment, intra smoothing is applied for a specific mode, color component or coding tool. Several embodiments are described below.

In one embodiment, intra smoothing is never applied on Planar mode.

In another embodiment, intra smoothing is always applied on Planar mode.

In another embodiment, intra smoothing is always applied on DC mode.

In another embodiment, intra smoothing is applied for wide-angle intra prediction, for both luma and chroma components.

In another embodiment, intra smoothing is applied when a transform type other than DCT-2 is used.

In another embodiment, intra smoothing never applied when a transform type other than DCT-2 is used.

In another embodiment, intra smoothing is always applied when PDPC (Position-Dependent Prediction Combination) is used.

In another embodiment, intra smoothing is never applied when PDPC is used.

In another embodiment, intra smoothing is always applied when NSST (Non-Separable Secondary Transform) is used.

In another embodiment, intra smoothing is never applied when NSST is used.

In one embodiment, intra smoothing is never applied on CCLM (Cross-Component Linear Mode) mode.

In another embodiment, intra smoothing is always applied on CCLM mode.

Figure 12:
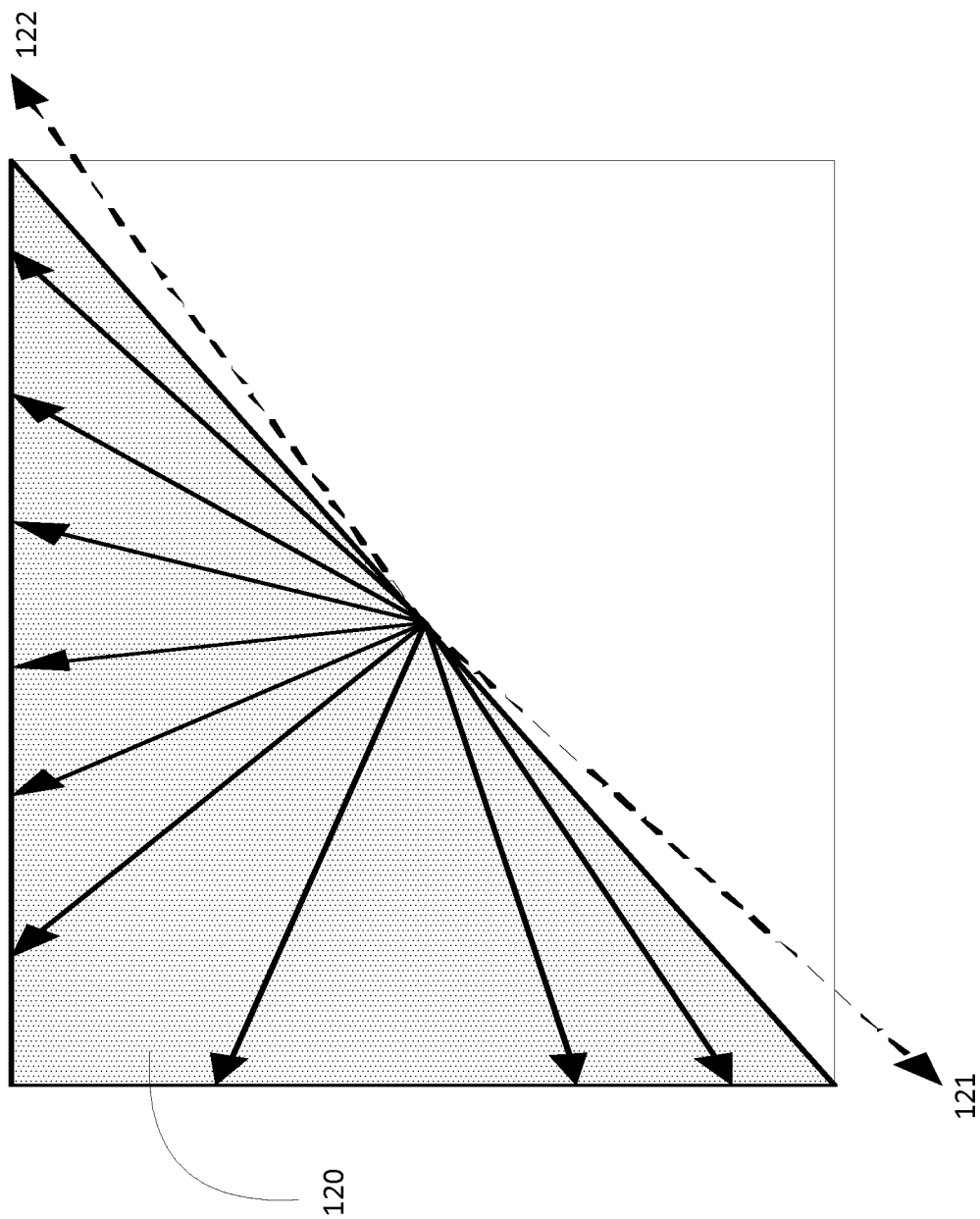
FIG. 12 is a diagram illustrating prediction angles within and beyond the diagonal directions.

PDPC may be applied to the angular modes which are close to the diagonal direction of its block shape, where the diagonal direction is indicated by the line connecting the top-right and bottom-left corners. As indicated in FIG. 12, the prediction angles (solid arrows) located within the top-left textured triangle area (120) are intra prediction angles within diagonal direction, and the prediction angles (dotted angles) 121 and 122 located outside the top-left textured triangle area are intra prediction angle beyond diagonal direction. Further embodiments are described below.

In one embodiment, the number of modes for applying PDPC is the same for different block shapes.

In another embodiment, the number of modes for applying PDPC is different for square and non-square blocks.

In another embodiment, the number of modes for applying PDPC is different for the bottom-left and top-right diagonal direction when the current block is a non-square block.

In another embodiment, PDPC is not applied to bottom-left angles below the horizontal direction, i.e., modes 2~17, when the width is larger than the height.

In another embodiment, PDPC is not applied to top-right angles above the vertical directions, i.e., modes 51~mode 66, when the height is larger than the width.

The techniques and embodiments described above, can be implemented as computer software using computer-readable instructions and physically stored in one or more computer-readable media. For example, FIG. 13 shows a computer system 1300 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
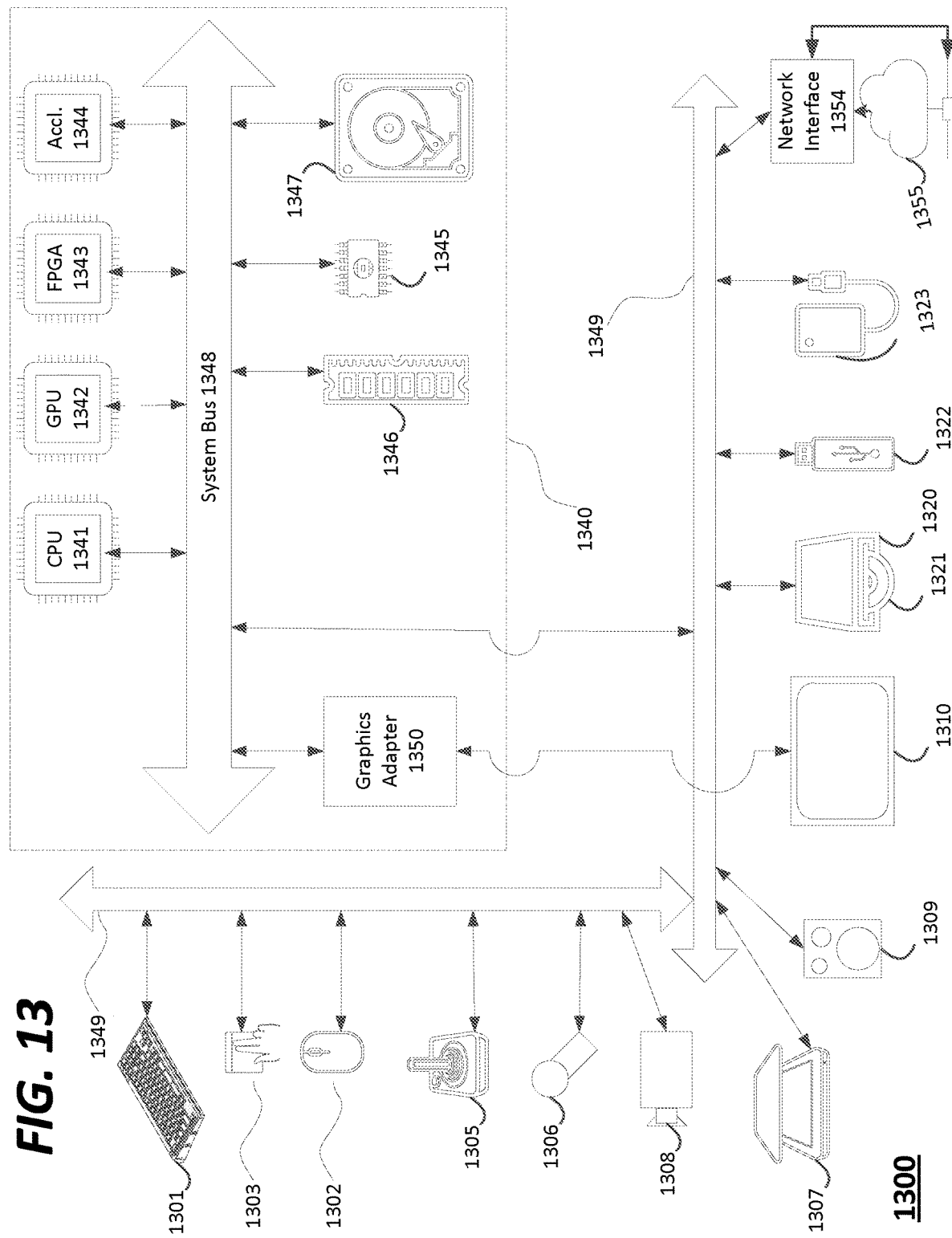
FIG. 13 is a schematic illustration of a computer system in accordance with an embodiment.

The components shown in FIG. 13 for computer system 1300 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1300.

Computer system 1300 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1301, mouse 1302, trackpad 1303, touch screen 1310, data-glove (not shown), joystick 1305, microphone 1306, scanner 1307, and camera 1308.

Computer system 1300 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1310, data-glove (not shown), or joystick 1305, but there can also be tactile feedback devices that do not serve as input devices), audio output devices (such as: speakers 1309, headphones (not depicted)), visual output devices (such as screens 1310 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1300 can also include human accessible storage devices and their associated media such as optical media including CD/DVD ROM/RW 1320 with CD/DVD or the like media 1321, thumb-drive 1322, removable hard drive or solid state drive 1323, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1300 can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 1349 (such as, for example USB ports of the computer system 1300); others are commonly integrated into the core of the computer system 1300 by attachment to a system bus as described below (for example Ethernet interface into a PC computer system or cellular network interface into a smartphone computer system). Using any of these networks, computer system 1300 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1340 of the computer system 1300.

The core 1340 can include one or more Central Processing Units (CPU) 1341, Graphics Processing Units (GPU) 1342, specialized programmable processing units in the form of Field Programmable Gate Areas (FPGA) 1343, hardware accelerators for certain tasks 1344, and so forth. These devices, along with Read-only memory (ROM) 1345, Random-access memory 1346, internal mass storage such as internal non-user accessible hard drives, SSDs, and the like 1347, may be connected through a system bus 1348. In some computer systems, the system bus 1348 can be accessible in the form of one or more physical plugs to enable extensions by additional CPUs, GPU, and the like. The peripheral devices can be attached either directly to the core's system bus 1348, or through a peripheral bus 1349. Architectures for a peripheral bus include PCI, USB, and the like.

CPUs 1341, GPUs 1342, FPGAs 1343, and accelerators 1344 can execute certain instructions that, in combination, can make up the aforementioned computer code. That computer code can be stored in ROM 1345 or RAM 1346. Transitional data can be also stored in RAM 1346, whereas permanent data can be stored for example, in the internal mass storage 1347. Fast storage and retrieve to any of the memory devices can be enabled through the use of cache memory, that can be closely associated with one or more CPU 1341, GPU 1342, mass storage 1347, ROM 1345, RAM 1346, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1300, and specifically the core 1340 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1340 that are of non-transitory nature, such as core-internal mass storage 1347 or ROM 1345. The software implementing various embodiments of the present disclosure can be stored in such devices and executed by core 1340. A computer-readable medium can include one or more memory devices or chips, according to particular needs. The software can cause the core 1340 and specifically the processors therein (including CPU, GPU, FPGA, and the like) to execute particular processes or particular parts of particular processes described herein, including defining data structures stored in RAM 1346 and modifying such data structures according to the processes defined by the software. In addition or as an alternative, the computer system can provide functionality as a result of logic hardwired or otherwise embodied in a circuit (for example: accelerator 1344), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method of processing visual media data, the method comprising:
   performing a conversion between a visual media file and a bitstream of visual media data according to a format rule, wherein
   the bitstream includes a block of the visual media data encoded based on an intra prediction angle corresponding to an intra prediction mode that is a directional intra prediction mode and not a planar intra prediction mode, the intra prediction angle being (i) beyond a bottom left direction 45 degrees from horizontal mode, or (ii) beyond a top right direction 45 degrees from the horizontal mode, and
   the bitstream includes the intra prediction mode based on a predetermined plurality of intra prediction modes and a corresponding predetermined plurality of intra prediction angles, the intra prediction mode corresponding to the intra prediction angle of the block.

2. The method recited in claim 1, wherein
   a first intra prediction angle is associated with intra prediction modes −1 and 67 in the predetermined plurality of intra prediction modes,
   a second intra prediction angle is associated with intra prediction modes −2 and 68 in the predetermined plurality of intra prediction modes;
   a third intra prediction angle is associated with intra prediction modes −3 and 69 in the predetermined plurality of intra prediction modes;
   a fourth intra prediction angle is associated with intra prediction modes −4 and 70 in the predetermined plurality of intra prediction modes;
   a fifth intra prediction angle is associated with intra prediction modes −5 and 71 in the predetermined plurality of intra prediction modes;
   a sixth intra prediction angle is associated with intra prediction modes −6 and 72 in the predetermined plurality of intra prediction modes,
   a seventh intra prediction angle is associated with intra prediction modes −7 and 73 in the predetermined plurality of intra prediction modes;
   an eighth intra prediction angle is associated with intra prediction modes −8 and 74 in the predetermined plurality of intra prediction modes;
   a ninth intra prediction angle is associated with intra prediction modes −9 and 75 in the predetermined plurality of intra prediction modes; and
   a tenth intra prediction angle is associated with intra prediction modes −10 and 76 in the predetermined plurality of intra prediction modes.

3. The method recited in claim 2, wherein
   the block encoded based on the intra prediction angle is encoded based on one of the first intra prediction angle, the second intra prediction angle, the third intra prediction angle, the fourth intra prediction angle, the fifth intra prediction angle, the sixth intra prediction angle, the seventh intra prediction angle, the eighth intra prediction angle, the ninth intra prediction angle, or the tenth intra prediction angle.

4. The method recited in claim 1, wherein
   the block encoded based on the intra prediction angle is encoded based on a relationship between the predetermined plurality of intra prediction modes and the predetermined plurality of intra prediction angles.

5. The method recited in claim 1, wherein
   the predetermined plurality of intra prediction modes includes ten intra prediction modes that are beyond the bottom left direction 45 degrees from horizontal; and
   the predetermined plurality of intra prediction modes includes ten intra prediction modes that are beyond the top right direction 45 degrees from horizontal.

6. The method recited in claim 1, wherein
   a first plurality of the predetermined plurality of intra prediction modes that are beyond the bottom left direction 45 degrees from horizontal mode include integer values in a range of −1 to −10; and
   a second plurality of the predetermined plurality of intra prediction modes that are beyond the top right direction 45 degrees from the horizontal mode include integer values in a range of 67 to 76.

7. The method recited in claim 6, wherein
   the predetermined plurality of intra prediction angles corresponding to each of the first and second predetermined plurality of prediction modes include intra prediction angles in a range of 35 to 114.

8. The method recited in claim 1, wherein:
   the predetermined plurality of intra prediction modes go beyond mode 2 of an HEVC (High Efficiency Video Coding) standard; and
   the predetermined plurality of intra prediction modes go beyond mode 34 of the HEVC standard.

9. The method recited in claim 1, comprising:
   responsive to a width W of the block being greater than a height H of the block,
   the intra prediction angle is greater than $((32*H/W)+1)$, and
   the intra prediction mode is less than 34,
   when the intra prediction angle is greater than 9, the intra prediction mode is modified by adding 65, and
   when the intra prediction angle is 9 or less, the intra prediction mode is set to 66.

10. The method recited in claim 1, comprising:
    responsive to a width W of the block being less than a height H of the block,
    the intra prediction angle is greater than $((32*W/H)+1)$, and
    the intra prediction mode is greater than 34,
    when the intra prediction angle is greater than 9, the intra prediction mode is modified by subtracting 67, and
    when the intra prediction angle is 9 or less, the intra prediction mode is set to 2.

11. The method recited in claim 1, comprising:
responsive to a width W of the block being greater than a height H of the block,
    the intra prediction angle is greater than ((32*H/W)+1), and
    the intra prediction mode is less than 34,
when the intra prediction angle is greater than 9, the intra prediction mode by is modified by adding 65, and
when the intra prediction angle is 9 or less, the intra prediction mode is modified by subtracting the intra prediction mode from 68.

12. The method recited in claim 1, comprising:
responsive to a width W of the block being less than a height H of the block,
    the intra prediction angle is greater than ((32*W/H)+1), and
    the intra prediction mode is greater than 34,
when the intra prediction angle is greater than 9, the intra prediction mode is modified by subtracting 67, and
when the intra prediction angle is 9 or less, the intra prediction mode is modified by subtracting the intra prediction mode from 68.

13. The method recited in claim 1, comprising:
responsive to a width W of the block being greater than a height H of the block,
    the intra prediction angle is greater than ((32*H/W)+1), and
    the intra prediction mode is less than 34,
when the intra prediction angle is greater than 9, the intra prediction mode is modified by adding 65, and
when the intra prediction angle is 9 or less, the intra prediction mode is set to 76.

14. The method recited in claim 1, comprising:
responsive to a width W of the block being less than a height H of the block,
    the intra prediction angle is greater than ((32*W/H)+1), and
    the intra prediction mode is greater than 34,
when the intra prediction angle is greater than 9, the intra prediction mode is modified by subtracting 67, and
when the intra prediction angle is 9 or less, the intra prediction mode is set to −10.

15. An apparatus for video encoding, the apparatus comprising:
    processing circuitry configured to
        generating a coded video bitstream by encoding a block based on an intra prediction angle corresponding to an intra prediction mode that is a directional intra prediction mode and not a planar intra prediction mode, the intra prediction angle being (i) beyond a bottom left direction 45 degrees from horizontal mode, or (ii) beyond a top right direction 45 degrees from the horizontal mode,
        wherein the coded video bitstream indicates the intra prediction mode based on a predetermined plurality of intra prediction modes and a corresponding predetermined plurality of intra prediction angles, the intra prediction mode corresponding to the intra prediction angle of the block.

16. The apparatus recited in claim 15, wherein
a first intra prediction angle is associated with intra prediction modes −1 and 67 in the predetermined plurality of intra prediction modes,
a second intra prediction angle is associated with intra prediction modes −2 and 68 in the predetermined plurality of intra prediction modes;
a third intra prediction angle is associated with intra prediction modes −3 and 69 in the predetermined plurality of intra prediction modes;
a fourth intra prediction angle is associated with intra prediction modes −4 and 70 in the predetermined plurality of intra prediction modes;
a fifth intra prediction angle is associated with intra prediction modes −5 and 71 in the predetermined plurality of intra prediction modes;
a sixth intra prediction angle is associated with intra prediction modes −6 and 72 in the predetermined plurality of intra prediction modes,
a seventh intra prediction angle is associated with intra prediction modes −7 and 73 in the predetermined plurality of intra prediction modes;
an eighth intra prediction angle is associated with intra prediction modes −8 and 74 in the predetermined plurality of intra prediction modes;
a ninth intra prediction angle is associated with intra prediction modes −9 and 75 in the predetermined plurality of intra prediction modes; and
a tenth intra prediction angle is associated with intra prediction modes −10 and 76 in the predetermined plurality of intra prediction modes.

17. The apparatus recited in claim 16, wherein
the block encoded based on the intra prediction angle is encoded based on one of the first intra prediction angle, the second intra prediction angle, the third intra prediction angle, the fourth intra prediction angle, the fifth intra prediction angle, the sixth intra prediction angle, the seventh intra prediction angle, the eighth intra prediction angle, the ninth intra prediction angle, or the tenth intra prediction angle.

18. The apparatus recited in claim 15, wherein
the block encoded based on the intra prediction angle is encoded based on a relationship between the predetermined plurality of intra prediction modes and the predetermined plurality of intra prediction angles.

19. The apparatus recited in claim 15, wherein
the predetermined plurality of intra prediction modes includes ten intra prediction modes that are beyond the bottom left direction 45 degrees from horizontal; and
the predetermined plurality of intra prediction modes includes ten intra prediction modes that are beyond the top right direction 45 degrees from horizontal.

20. A method for video decoding comprising:
reconstructing a block of a coded video bitstream, the block being encoded based on an intra prediction angle corresponding to an intra prediction mode that is a directional intra prediction mode and not a planar intra prediction mode, the intra prediction angle being (i) beyond a bottom left direction 45 degrees from horizontal mode, or (ii) beyond a top right direction 45 degrees from the horizontal mode,
wherein the coded video bitstream indicates the intra prediction mode based on a predetermined plurality of intra prediction modes and a corresponding predetermined plurality of intra prediction angles, the intra prediction mode corresponding to the intra prediction angle of the block.

\* \* \* \* \*